United States Patent [19]

Sanders

[11] Patent Number: 4,771,275
[45] Date of Patent: Sep. 13, 1988

[54] METHOD AND APPARATUS FOR ASSIGNING COLOR VALUES TO BIT MAP MEMORY DISPLAY LOCATIONS

[76] Inventor: Eugene Sanders, 1505 Solano Ave., Berkeley, Calif. 94707

[21] Appl. No.: 552,574

[22] Filed: Nov. 16, 1983

[51] Int. Cl.⁴ ............................................. G09G 1/28
[52] U.S. Cl. .................................... 340/703; 340/701; 340/728
[58] Field of Search .............. 340/703, 750, 728, 701; 358/12, 283

[56] References Cited

U.S. PATENT DOCUMENTS

| | | | |
|---|---|---|---|
| 4,233,601 | 11/1980 | Hankins et al. | 340/703 |
| 4,237,457 | 12/1980 | Houldsworth | 340/728 |
| 4,439,759 | 3/1984 | Fleming et al. | 340/703 |
| 4,442,428 | 4/1984 | Dean et al. | 340/703 |
| 4,447,809 | 5/1984 | Kodama et al. | 340/703 X |
| 4,454,506 | 6/1984 | Netravali et al. | 340/728 |
| 4,475,104 | 10/1984 | Shen | 340/703 X |
| 4,484,187 | 11/1984 | Brown et al. | 340/703 |
| 4,509,043 | 4/1985 | Mossaides | 340/703 X |
| 4,532,503 | 7/1985 | Pennebaker | 340/728 |
| 4,584,572 | 4/1986 | Lambert, III | 340/728 X |

Primary Examiner—Gerald L. Brigance
Assistant Examiner—Jeffery A. Brier
Attorney, Agent, or Firm—Townsend & Townsend

[57] ABSTRACT

A high resolution, multicolor frame buffer memory and sequential read/write logic provides high speed access and reduced memory requirement for a scanning display. Frame buffer memory bits are assigned corresponding display location color values according to a selected pattern and color distribution scheme. Current display locations and neighboring display locations, including subsequent and/or preceding display lines, are examined to assemble color information for each current display location, such that a plurality of color values are combined for each display location, even though the frame buffer memory only stores one color value for each display location.

31 Claims, 8 Drawing Sheets

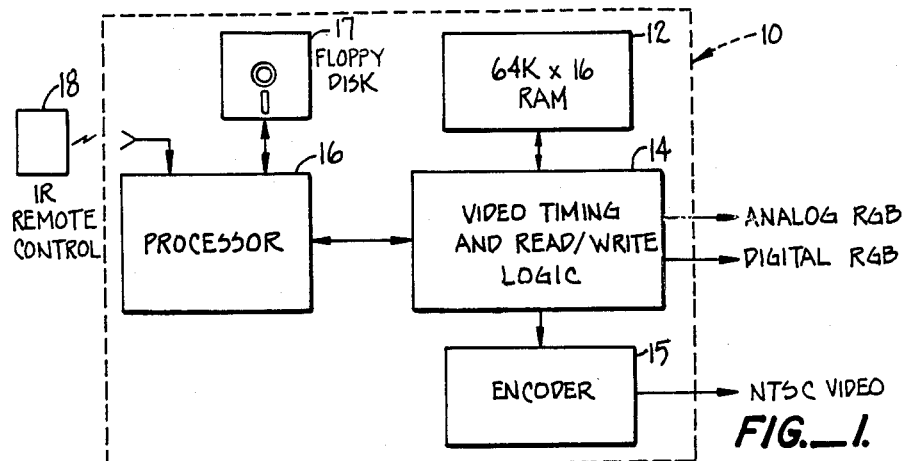

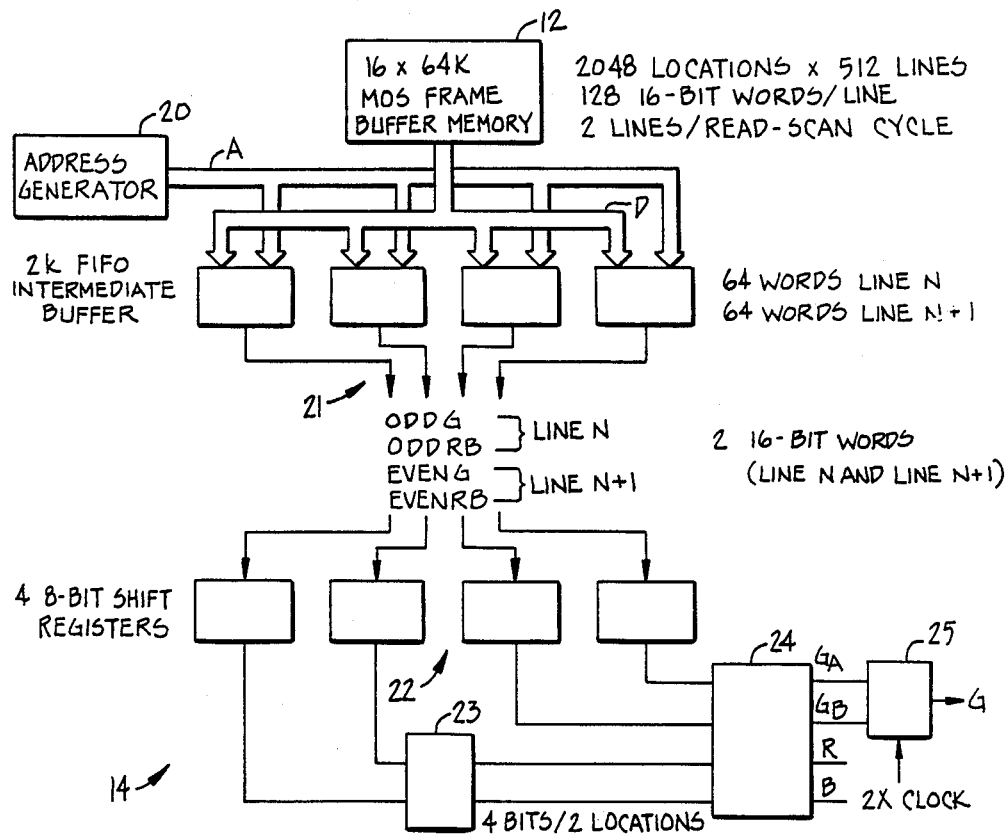
FIG._3.
FIG._4.

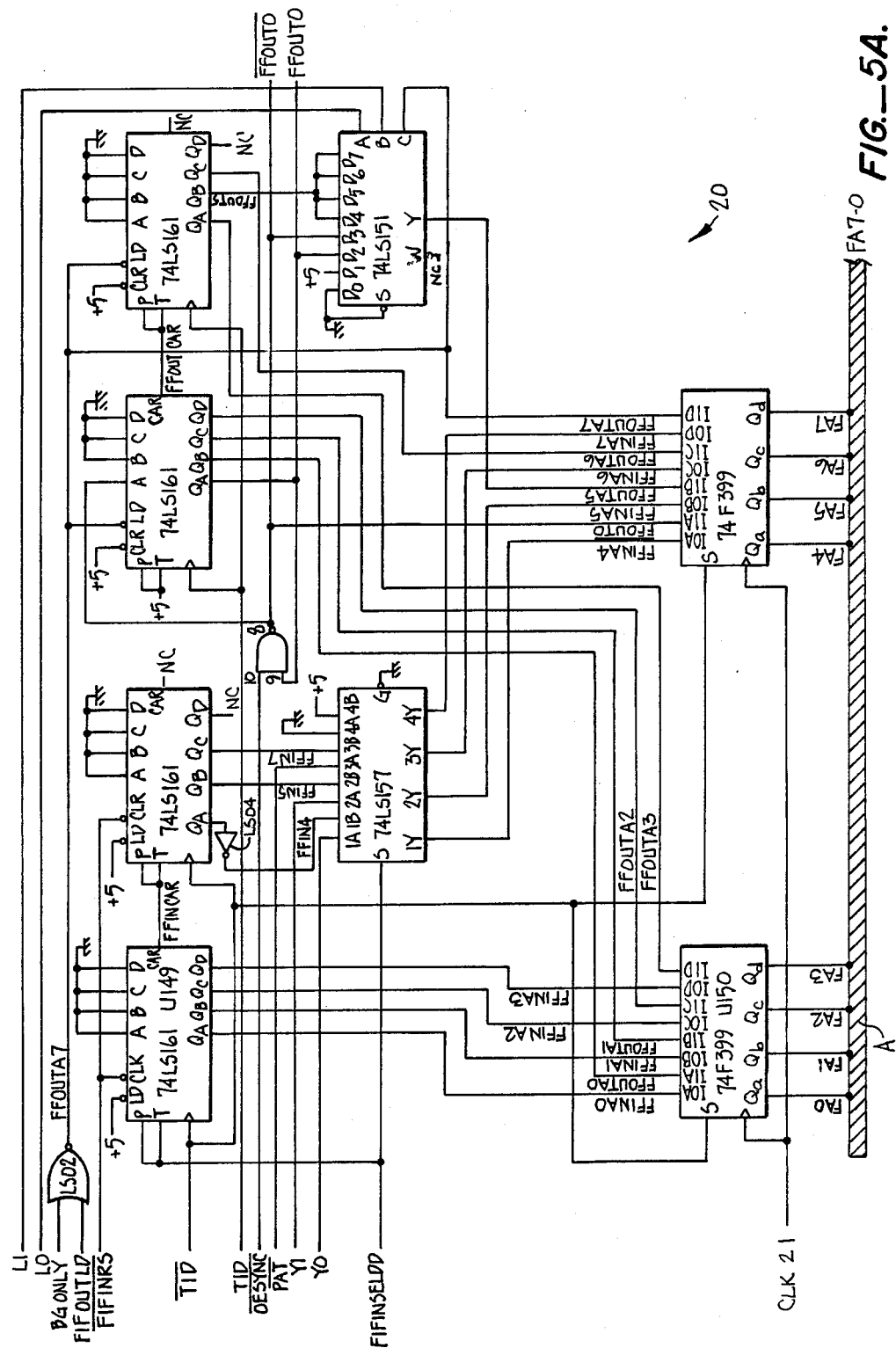
FIG._5A.

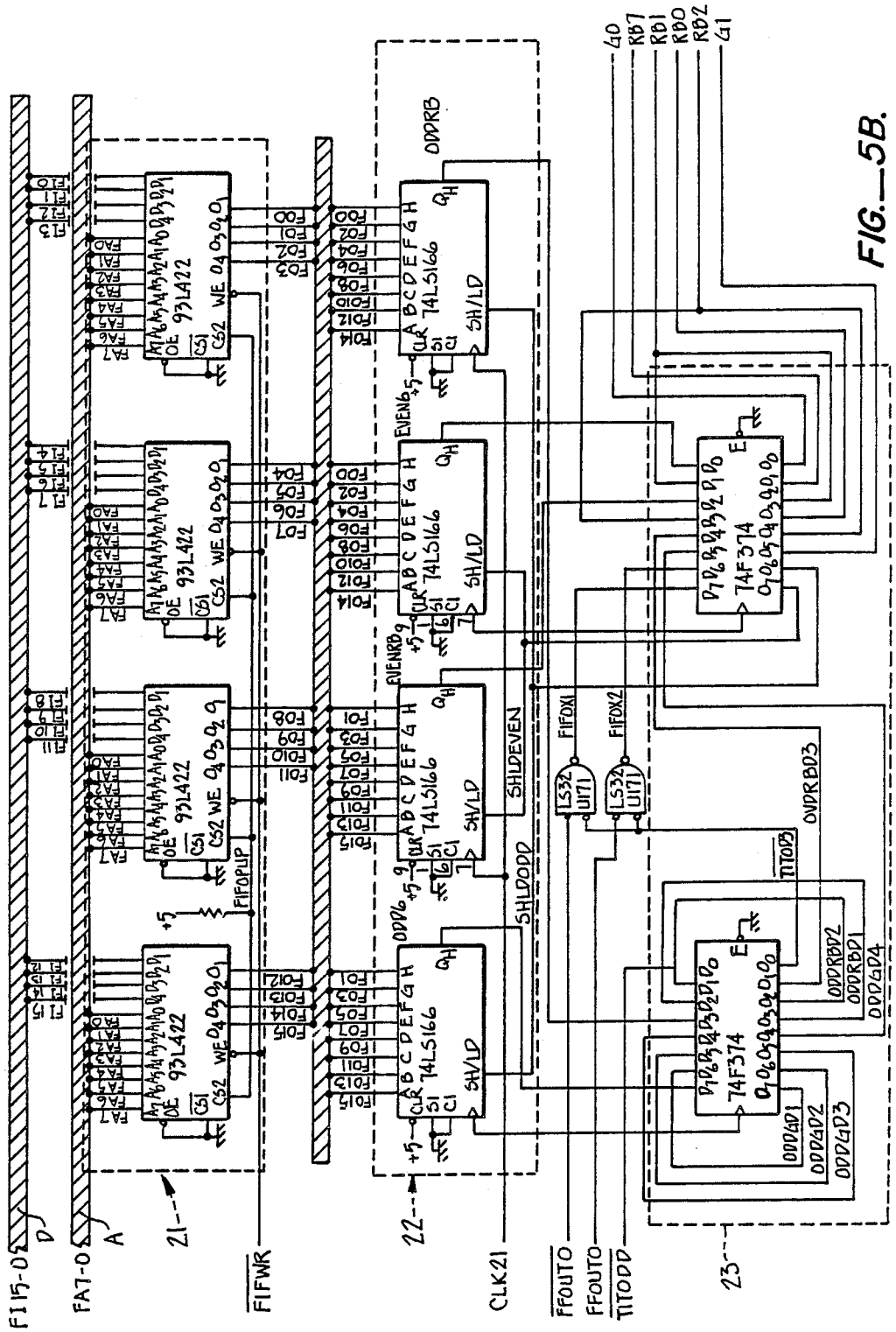
FIG._5B.

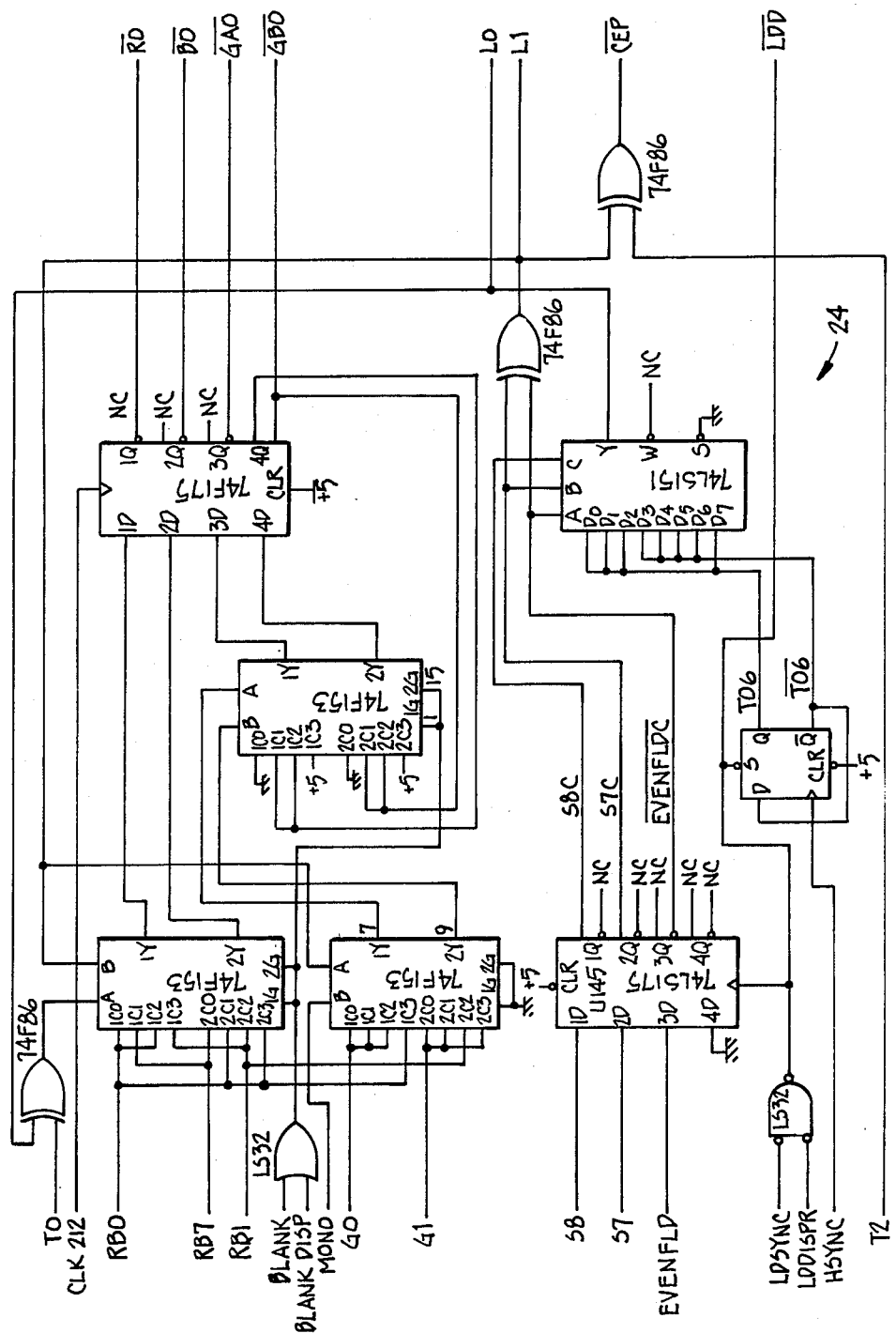
FIG._5C.

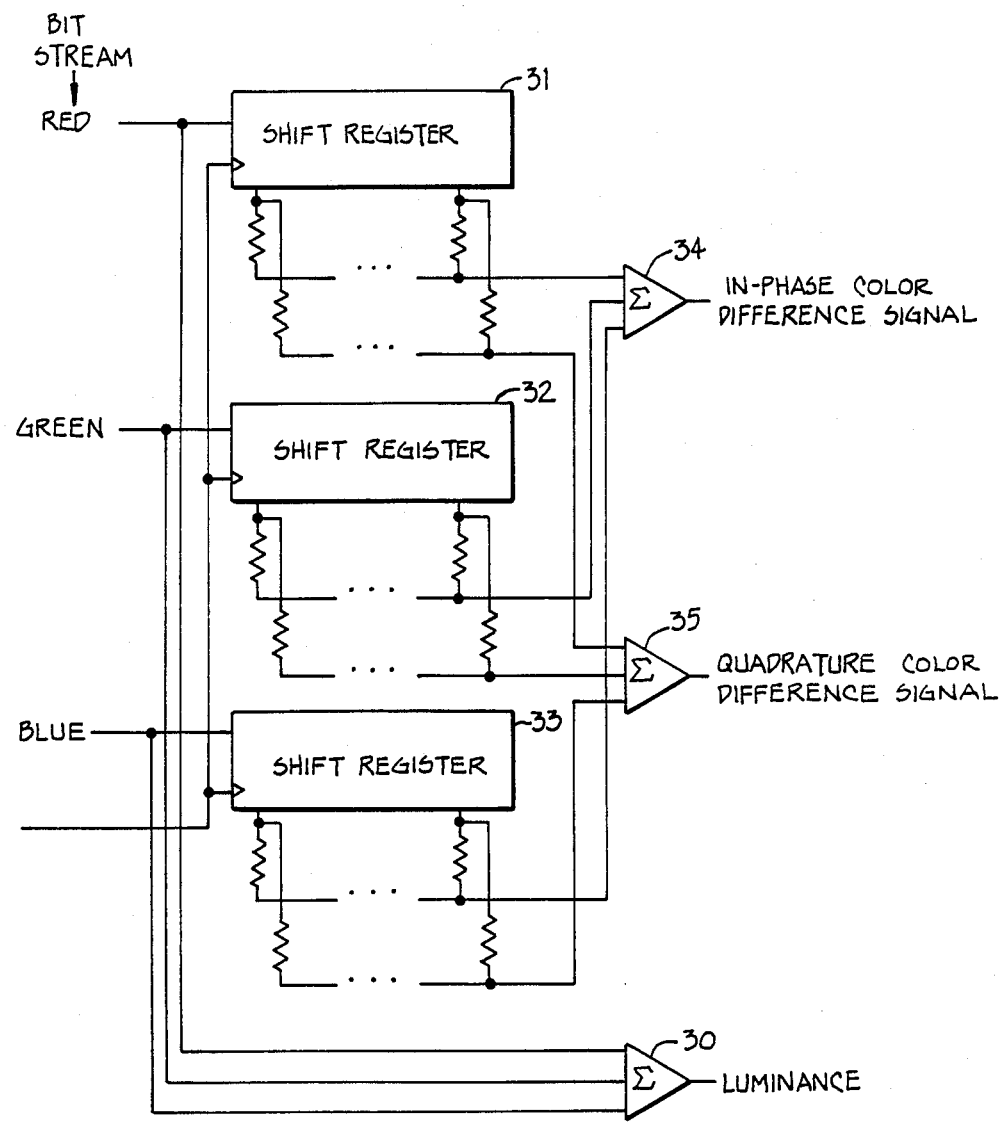
FIG._6.

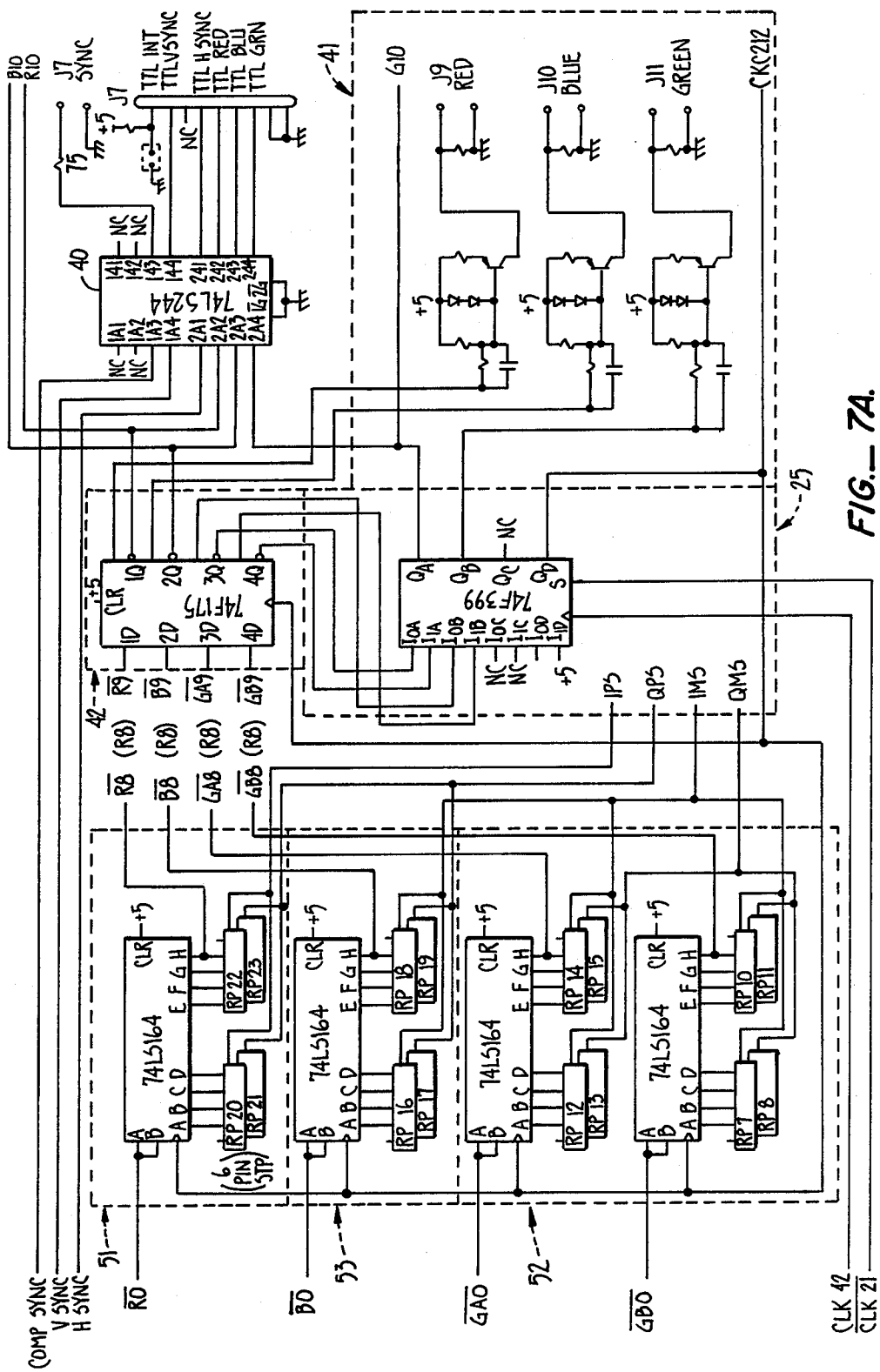
FIG.—7A.

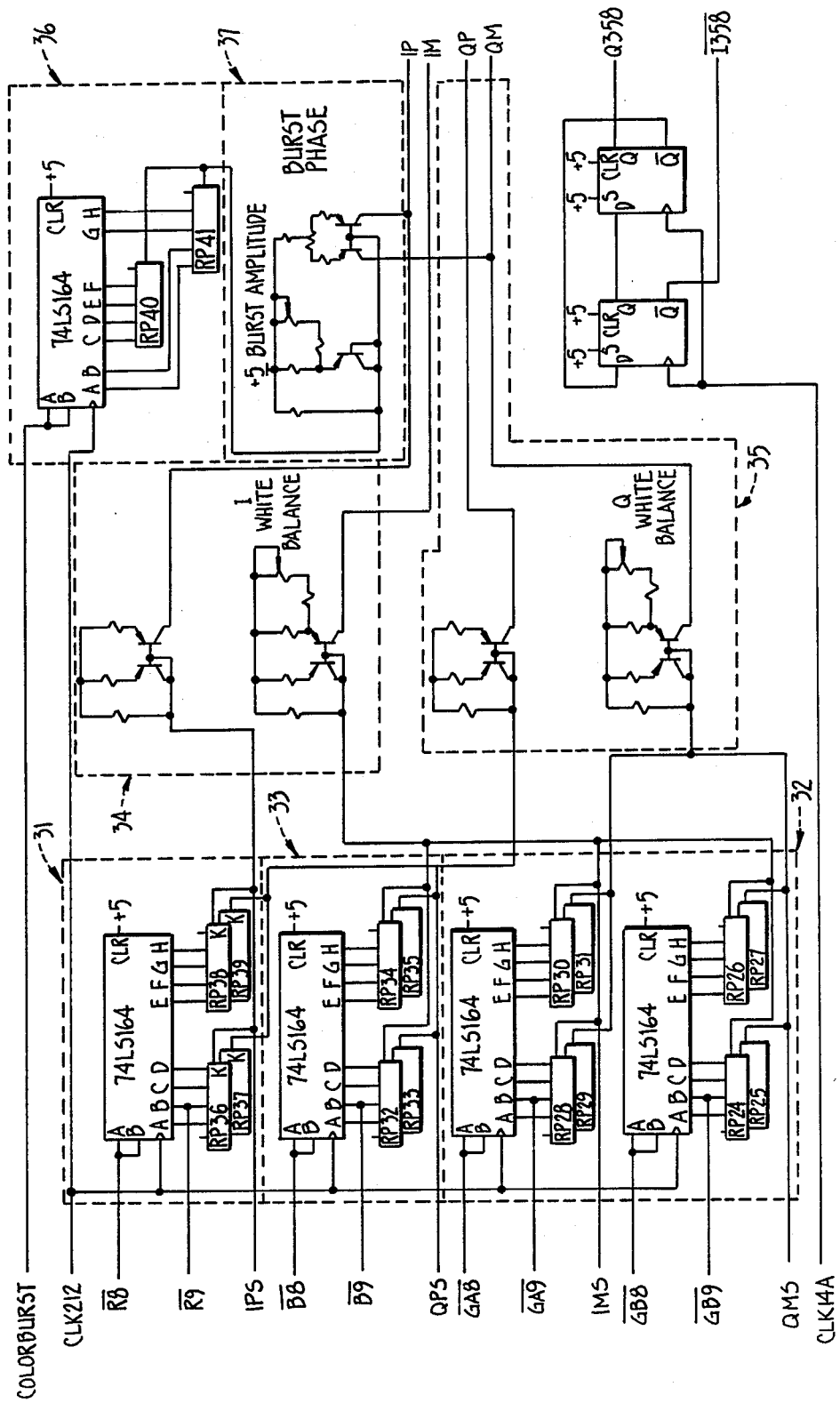
FIG._7B.

METHOD AND APPARATUS FOR ASSIGNING COLOR VALUES TO BIT MAP MEMORY DISPLAY LOCATIONS

An appendix with an object code listing of an exemplary computer program for a microprocessor used in exemplary embodiment of the present invention is submitted as part of this patent application.

BACKGROUND OF THE INVENTION

1. Field of the Invention

The present invention relates to the display of digital data. More particularly, the present invention relates to high resolution, multiple color display of bit mapped images.

2. Description of the Prior Art

Prior art scanning displays have a light gun of a single color that moves an electron beam along a line from left to right on a display screen having about 480 lines from top to bottom. Display information is represented on the screen by turning the electron beam "on" and "off" as it is moved across each line. A corresponding digital memory, within an associated computer referred to as the frame buffer memory, includes a matrix of data storage locations (bits), each of which represents the "on" or "off" condition of the electron beam at some point on the display screen.

The number of bits in memory equals the number of individual, separately addressable locations on the display screen. The number of discrete screen locations determines display resolution. To achieve a display resolution of 640 locations per line in a display having 480 lines (referred to as a "high resolution" display of 640×480), a digital memory of 307,200 bits is required to store an image to be displayed.

The image information stored in memory provides a continuously read electronic map of the display screen surface that continuously effects the control of the electron beam as it is moved across the display screen. Such technique is referred to as bit mapping—i.e. each bit in memory has a one-to-one (mapped) relationship with a corresponding screen location. The "on" or "off" condition of the bit at each memory location mandates the "on" or "off" condition of the electron beam at that point on the display screen. High resolution is achieved by increasing the number of display locations and the corresponding number of memory bits.

A color display requires the addition of color information for each screen location (or memory bit) as well as beam "on" and "off" information. If, for example, one of four colors is be displayed per screen location, then two bits are required per location to store the one-of-four color selection information. For a four color, 640×480 resolution screen, 640×480×2 or 614,400 memory bits are required. If 16 colors are to be provided per screen location, then 680×480×4 or 1,228,800 memory bits are required.

As resolution or color choice increases, memory size must also increase. The industry standard establishes a display of 640×480 as a high resolution display, a display of 768×768 as a very high resolution display, and a display of 1,024×1,024 as an ultra high resolution display. High color selection is considered to be one having a choice of 64 colors. Accordingly, for an ultra high resolution, 64 color system, a memory of 1,024×1,024×6 or 6,291,456 bits of memory are required.

SUMMARY OF THE INVENTION

The present invention provides an effective display resolution of 2,048×512 with more than 4,000 color choices using only 1,048,576 bits of frame buffer memory. The invention achieves a three-fold increase in resolution and a 500-fold increase in color selection for the same amount of memory required for a standard high resolution eight color display system. The present invention achieves this economy of memory and corresponding speed of operation by a novel combination of visual physiology and memory-to-screen mapping techniques.

In the present invention, the "frame buffer memory" is defined to be the area where a digital representation of the "display screen" is stored. The frame buffer memory in the preferred embodiment of the present invention consists of 1,048,576 individual bit positions in the format 2,048×512, where 2,048 represents the division of each "line" on the display screen into 2,048 bit locations (or pixels) and where the display screen is divided into 512 lines. The displayed screen image (that which is visible to a viewer) is made up of 2,048 pixels per line with 484 lines.

Pixels on the display screen (2,048×484) are related to the bits in the frame buffer memory (2,048×512), but not necessarily on a one-to-one relationship. Each bit in the frame buffer memory represents a pixel position on the display screen. Additionally, each pixel on the display screen may have the presence of colors red, green, and/or blue. Because three pieces of color information is required for each pixel, it is not possible to have one bit in the frame buffer memory carry all the color information for each pixel.

The present invention provides a "neighborhood" frame buffer memory for accomplishing screen "mapping". The invention converts the contents of each frame buffer bit into a three color pixel by looking at the bit values around that particular frame buffer memory position (i.e. in the neighborhood), and thereafter determining whether the resulting pixel contains red, green, and/or blue information. Translation from frame buffer memory bits to display screen pixel and color information (red, green, and blue) is termed "mapping".

If every bit in the frame buffer memory is turned "on", the frame buffer memory has a color distribution as is shown in Table 1 (where R=red, G=green, and B=blue).

TABLE 1

| | | COLOR DISTRIBUTION | | | | | | | | | | | | | | | |
|---|---|---|---|---|---|---|---|---|---|---|---|---|---|---|---|---|---|
| line | bit | 0 | 1 | 2 | 3 | 4 | . | . | . | . | . | . | . | . | . | . | 2047 |
| 0 | | G | R | B | G | R | B | G | R | B | G | B | G | R | . | . | . |
| 1 | | R | G | B | G | R | G | B | G | R | G | B | G | R | G | . | . |
| 2 | | G | B | G | R | G | B | G | R | G | B | G | R | G | B | . | . |
| 3 | | B | G | R | G | B | G | R | G | B | G | R | G | B | G | . | . |
| 4 | | G | R | B | G | R | . G | B | G | R | G | B | G | R | . | . | . |

TABLE 1-continued
COLOR DISTRIBUTION

| line | bit | 0 | 1 | 2 | 3 | 4 | . | . | . | . | . | . | . | . | . | 2047 |
|---|---|---|---|---|---|---|---|---|---|---|---|---|---|---|---|---|
| . | | . | . | . | . | . | . | . | . | . | . | . | . | . | . | . |

The color distribution of Table 1 does not illustrate the color and display information that is actually displayed on the screen. Rather, bit information is processed according to the color distribution scheme to "map" the image to be displayed onto the display screen. The inventor has recognized that the green component in a display contributes over half of the display's "apparent" brightness or luminance. In the preferred embodiment, the present invention assigns twice as many bits in the frame buffer memory to the color green as there are for red or blue. Because the human eye is more sensitive to changes in brightness than it is to changes in hue, providing more green bits in the frame buffer memory than red or blue bits produces an "apparent" increase in display resolution and contrast. Accordingly, the invention exploits in a useful manner the property of the human eye by which detail is more readily detected as a variation of brightness than as a variation of hue.

One novel aspect of the present invention is that only one frame buffer memory bit is required to produce three bits of color information per pixel (red on/red off, green on/green off, and/or blue on/blue off). The invention substantially reduces the size of the frame buffer memory, making it physically manageable and economically feasible. The present invention provides a mapping scheme by which reduction in frame buffer memory size provides a corresponding increase in frame buffer memory speed. As a result, heretofore unavailable display effects may be rapidly provided without loss in resolution.

The present invention may provide a number of mapping schemes in accordance with the recognition by the inventor that color information may be shared among neighboring bits. One such mapping scheme provides an apparatus for determining if the red, green, and/or blue guns are to be turned on at a particular display screen location. The frame buffer memory is scanned at the same rate and position as the electron beams (red, green, and blue for a color display) are scanned across the display screen. For example, when the color to be put on the screen at the screen position 5,986 (line number 5, pixel number 986) is being determined, the frame buffer memory is being scanned at position 5,986 to make this determination.

The following provides an example of one such color mapping scheme:

(a) Green:
  (1) If the frame buffer memory bit is a G (green), then the green gun is turned on if the bit at that position is true.
  (b 2) If the frame buffer memory bit is not a G, then the green gun is turned on if the G-bit directly below it is true.
(b) Red:
  (1) If the frame buffer memory bit is an R (red), then the red gun is turned on if the R-bit directly below and to the left is true.
  (2) If the frame buffer memory bit is a B (blue), then the red gun is turned on if the R-bit is directly below and to the right is true.
  (3) If the frame buffer memory bit is a G preceded by a B, then the red gun is turned on if the R-bit directly to the right is true.
  (4) If the frame buffer memory bit is a G preceded by an R, then the red gun is turned on if the R-bit directly to the left is true.
(c) Blue:
  (1) If the frame buffer memory bit is a B, then the blue gun is turned on if the B-bit below and to the left is true.
  (2) If the frame buffer memory bit is an R, then the blue gun is turned on if the B-bit directly below and to the right is true.
  (3) If the frame buffer memory bit is a G preceded by an R, then the blue gun is turned on if the B-bit directly to the right is true.
  (4) If the frame buffer memory bit is a G preceded by a B, then the blue gun is turned on if the B-bit directly to the left is true.

Each G-bit determines the on/off state of the green gun at the corresponding pixel position and at the pixel position directly above it. Each R-bit determines the on/off state of the red gun at the pixel positions to the right, left, above left, and above right. Each B-bit determines the on/off state of the blue gun at the pixel positions to the left, right, above left, and above right.

The present invention also converts RGB information to an NTSC standard. Other mapping schemes may also be provided in various embodiments of the invention with different color assignment ratios and distribution schemes. Another embodiment of the invention maps chroma and luminance information instead of red, green, and blue information to produce a color output in any display standard, such as the NTSC standard.

BRIEF DESCRIPTION OF THE FIGURES

FIG. 1 is a block diagram of a preferred embodiment of the present invention;

FIG. 2 is a schematic representation of a first preferred mapping scheme;

FIG. 3 is a schematic presentation of a second preferred mapping scheme;

FIG. 4 is a block diagram of a high speed buffer according to the present invention;

FIGS. 5a-5c are schematic diagrams of the high speed buffer;

FIG. 6 is a block diagram of an NTSC encoder according to the present invention; and FIGS. 7a-7c are schematic diagrams of the NTSC encoder.

DETAILED DESCRIPTION OF A PREFERRED EMBODIMENT

The preferred embodiment of the present invention provides a video display format of 2,048 pixels×512 lines with more than 4,000 choices of color. The high resolution display provided by the present invention is accomplished with 1,048,476 bits of frame buffer memory. Thus, the present invention achieves an economy of memory and a corresponding speed of operation.

Such improvements are achieved by a memory-to-screen mapping apparatus and method.

FIG. 1 is a simplified block diagram showing an application of the present invention in a video display system 10. A frame buffer memory 12 consists of a 64K×16 bit random access memory (RAM). Each bit of frame buffer memory 12 stores mapping information for the display image. Video timing and read/write logic circuit 14 receives information from frame buffer memory 12 on a memory bit per pixel basis, and by a neighborhood examination process, determines the color component at each location. An analog and digital RGB (red, green, blue) output is produced. An additional output from video timing and read/write logic circuit 14 is provided to an encoder 15 which produces an NTSC composite video output signal.

The preferred application of the present invention is in a video slide projector, under control of a processor 16, wherein digital data corresponding to various images is stored on a floppy disc 17. As an image is to be displayed, the information is read from floppy disc 17 and placed into frame buffer memory 12 under control of processor 16. Processor 16 may be operated by an infrared remote control 18, if desired.

It should be appreciated that the present invention is intended for a variety of video applications and may be used in various display technologies. Accordingly, processor 16 and associated circuitry is not shown in detail. It should be appreciated by those skilled in the art that any processor or microcomputer, such as the Apple IIE or the IBM PC, may be used to read and write data into frame buffer memory 12. An exemplary computer program is included as an appendix to this application. The appendix is an object code listing of a processor operating system and application software for producing graphics images.

FIG. 2 is a schematic representation of a first preferred mapping scheme that may be implemented by video timing and read/write logic circuit 14. In FIG. 2, frame buffer bit assignment is shown in a matrix having a series of display line rows and display position (pixel) columns. In the matrix, G represents the color green, R represents the color red, and B represents the color blue. This designation is maintained throughout the application. The matrix only displays a small portion of the total display screen, but a sufficient portion is displayed to show one preferred assignment scheme.

To understand the operation of the present invention reference is made to the preferred embodiment of the invention. It should be appreciated that the memory size and display size values, as well as the bit pattern arrangements described herein, are exemplary of preferred embodiments of the invention. It is contemplated that various embodiments of the present invention are possible.

The exemplary embodiment of the invention provides a 16×64K bit frame buffer memory for a total of 1,048,576 bits. Each memory bit corresponds to a location on a display screen. In prior art bit mapping schemes, color was provided by having 3 bits per pixel per display location, e.g. 1 bit per color gun in a red, blue, green display. The inventor herein has recognized that it is not necessary to have a discrete color value for each color gun at each bit location but rather, that color information may be shared within a neighborhood of locations. Accordingly, each bit in the frame buffer memory controls only one of the three color guns (red, green, and blue) for that location. The state of the other color guns at that location is a function of neighborhood color bit assignments. Referring to the frame buffer bit assignment in FIG. 2, it can be seen that at line 0, bit position 0, a green bit is provided by which the green gun is controlled; at line 0, bit position 1, a red bit is provided, and so forth.

Still referring to FIG. 2, the color bit assignments are viewed one color at a time. Thus, green is shown occupying every other bit position, while red is shown occupying every fourth bit position, and blue is shown occupying every fourth position. This particular bit assignment value is based on the inventor's recognition that the predominant portion of brightness or luminance information in a video display is provided by the green color gun. Thus, to provide high resolution and contrast, the preferred embodiment of the invention assigns the color green a frequency of bits twice that for the colors red and blue. In the preferred embodiment of the invention, there are approximately 500,000 green bits, and 250,000 bits each of red and blue. Accordingly, there are approximately 500,000 actual green display locations, and 250,000 actual red and blue display locations.

Information to operate three color guns is required for each display location. Accordingly, there must be some sharing of information between display locations. This sharing is provided by the present invention. In FIG. 2, bit mapping to screen position is shown for each color. For example, green lines 1 and 2, position 0 (1,0 and 2,0) are controlled by the green bit at line 2, position 0 (2,0). The red gun for lines 1 and 2, positions 2 and 4 (1,2; 1,4; 2,2; and 2,4) on each line is controlled by the bit at line 2, position 3 (2,3). Thus, for red (and likewise for blue), in the preferred mapping scheme, the colors to the left and right and also directly below the left and right, are controlled by the color bit for the current display location. Each green bit in memory controls the green value at two display locations, and each red and blue bit memory controls the red and blue values at four display locations.

Display brightness and color hue perceived by a viewer is a function of the distribution of the red, green, and blue bits. Such distribution may be made according to any selected scheme and may be provided in predetermined patterns stored in a pattern generator (not shown) to produce any selected colors. Common shape and symbol patterns may be stored in a character generator (not shown).

The frame buffer memory is scanned at the same rate and position as the electron beams (red, green, and blue for a color display) are scanned across the display screen. For example, when the color to be put on the screen at the screen position 5,986 (line number 5, pixel number 986) is being determined, the frame buffer memory is being scanned at position 5,986 to make this determination.

The following provides an example of one such color mapping scheme. This is a variation of the preferred mapping scheme in which the red and blue color bits control the positions to the left, right, and the positions directly above the left and right positions.

(a) Green:
  (1) If the frame buffer memory bit is a G (green), then the green gun is turned on if the bit at that position is true.
  (2) If the frame buffer memory bit is not a G, then the green gun is turned on if the G-bit directly below it is true.

(b) Red:
  (1) If the frame buffer memory bit is an R (red), then the red gun is turned on if the R-bit directly below and to the left is true.
  (2) If the frame buffer memory bit is a B (blue), then the red gun is turned on if the R-bit is directly below and to the right is true.
  (3) If the frame buffer memory bit is a G preceded by a B, then the red gun is turned on if the R-bit directly to the right is true.
  (4) If the frame buffer memory bit is a G preceded by an R, then the red gun is turned on if the R-bit directly to the left is true.
(c) Blue:
  (1) If the frame buffer memory bit is a B, then the blue gun is turned on if the B-bit below and to the left is true.
  (2) If the frame buffer memory bit is an R, then the blue gun is turned on if the B-bit directly below and to the right is true.
  (3) If the frame buffer memory bit is a G preceded by an R, then the blue gun is turned on if the B-bit directly to the right is true.
  (4) If the frame buffer memory bit is a G preceded by a B, then the blue gun is turned on if the B-bit directly to the left is true.

Each G-bit determines the on/off state of the green gun at the corresponding pixel position and at the pixel position directly above it. Each R-bit determines the on/off state of the red gun at the pixel positions to the right, left, above left, and above right. Each B-bit determines the on/off state of the blue gun at the pixel positions to the left, right, above left, and above right.

An alternate or second preferred color mapping scheme that provides the same green mapping procedure but changes the red and blue mapping as shown schematically in FIG. 3. For red, the bit corresponding to line 3, position 2 (3,2), controls lines 2 and 3, positions 2 and 3 for each line (2,2; 2,3; 3,2; and 3,3). The same assignment scheme is applied to blue. Other assignment schemes are possible and also provide high resolution. The important consideration in all such assignment schemes is that an examined neighborhood can consist of no more than the present display line and at least one other line directly above or below it (or spaced a number of lines).

FIG. 4 is a block diagram of a high speed buffer according to the present invention by which the above described mapping schemes are implemented. Frame buffer memory 12 is shown as a 16×64K bit metal oxide semiconductor device providing 2,048 display locations ×512 display lines arranged as 128 16-bit words per display line. Two display lines are read per scan cycle.

The image data is read out of the frame buffer in blocks of 16 words using the "page mode" feature of 64K dynamic RAM 8. The frame frame buffer is written into during the interval between the block reads.

The image data output from frame buffer memory 12 is routed via data bus D to a 2K-bit first-in, first-out (FIFO) intermediate buffer 21. Intermediate buffer 21 receives a 16-word input from frame buffer memory 12 for each current scan line during a scan cycle and for each next sequential line to be scanned during a next scan cycle. An address generator 20 routes address signals via an address bus A to operate intermediate buffer 21 to accordingly produce 16-bit data word outputs corresponding to each current scan line and to each next sequential scan line. In an interlaced scanning system where there are odd display lines and even display lines, the output of intermediate buffer 21 provides red, green, and blue information for an odd line and red, green and blue information for a juxtaposed even line.

The output of interediate buffer 21 is routed to four 8-bit shift registers 22. Each shift register receives eight bits of data from one of the 16-bit data words. The 16-bit word for an odd line is loaded into two of the 8-bit shift registers and the 16-bit word for an adjoining even line is loaded into the other two of the 8-bit shift registers. The output from shift registers 22 is delayed by delay circuit 23 to provide a neighborhood of color values to sequential logic circuit 24.

The output from sequential logic circuit 24 provides a red signal (R), a blue signal (B), and two green signals ($G_A$ and $G_B$). The $G_A$ and $G_B$ signals are coupled to a demultiplexer circuit 25 which is clocked at a rate 2×a standard circuit clock rate to produce a single green (G) signal.

The preferred embodiment of the present invention reads two lines at a time during a scan cycle to provide a neighborhood of display locations and corresponding display location color value information. During intermediate buffering and bit shifting in 8-bit shift registers 22, the neighborhood of display locations is examined and color information is generated. The neighborhood values are a function of the display location color value assignment and of the selection mapping scheme, as for example, shown in FIGS. 2 and 3. The schematic shown in FIGS. 5 and 7 and in the appendix implements the scheme shown in FIG. 3.

FIGS. 5a–5c provide a schematic diagram of part of video timing and read/write logic circuit 14. FIG. 5a is a schematic diagram of address generator circuit 20. Address generation is a factor in producing color neighborhood assignment and location. Address geeerator circuit 20 counts in a predetermined order to load intermediate buffer 21 from frame buffer memory 12 during a particular scan cycle.

FIG. 5b shows data bus D and address bus A coupled to intermediate buffer 21. An intermediate buffer output is shown coupled to four 8-bit shift registers 22, which thereafter provide an output to delay circuit 23.

FIG. 5c shows sequential logic circuit 24. Display data shifted out of four 8-bit shift registers 22 is provided as an input to sequential logic circuit 24. The sequential logic circuit operates to provide a mix of even display line and odd display line information to produce color and display information for two sequential display locations. Although the preferred embodiment of the invention provides for a neighborhood of two display lines and two sequential display locations, it should be appreciated that any number of display lines and display locations may be provided in other embodiments of the invention, depending on the pattern assignments and mapping schemes chosen.

A block diagram of a portion of an NTSC encoder is shown in FIG. 6. A bit stream containing red, green, and blue information is provided to, and clocked at, corresponding shift registers 51, 52, 53, 31, 32, and 33. The shift registers produce an analog-to-digital conversion. Different output signals produced at each shift register are provided to summing amplifiers 34 and 35, and in-phase color difference and quadrature color difference signals are produced. Additionally, red, green, and blue information is provided to summing amplifier 30 to produce a luminance signal.

A schematic diagram of RGB and NTSC encoding is provided in FIGS. 7a–7c. FIG. 7a shows the red, blue, and green ($G_a$ and $G_b$) signals coupled to shift registers 51, 52, and 53, which are arranged to provide digital and analog RGB outputs. The digital outputs are coupled to a quad flip-flop 42, which produces an output that contains red, green, and blue components. The red and blue components of the output from flip flop 42 are coupled directly to buffer circuit 41. The circuit clock that operates flip-flop 42 (not shown) runs at a rate corresponding to two display locations (one-half the scanning rate). Green component information output from flip-flop 42 is coupled to demultiplexer 25, which is clocked at a rate equal to the scanning rate. Red and blue component information is displayed for two sequential display locations during a scan cycle and green component information is updated for every display location during a scan cycle.

FIGS. 7a and 7b shows shift registers 51, 52, 53, 31, 32, and 33 coupled to summing amplifiers 34 and 35 to produce an in-line color difference signal and a quadrature color difference signal. A color burst signal is provided to burst amplifier circuit 36 and to burst amplitude and phase circuit 37 to produce a burst component of the in-phase and quadrature color difference signals.

FIG. 7c shows an NTSC output circuit 55, by which the in-phase and quadrature color difference signals are combined to produce a composite NTSC signal. Luminance information is added at this point by luminance summing amplifier 30 and the composite signal is provided to a monitor (not shown). Although an NTSC encoder is herein described, it should be appreciated that the present invention may include other television standards, such as PAL and SECAM.

Accordingly, the present invention provides a significant reduction in memory size required to produce high resolution multicolor displays. The invention also provides a significant decrease in access and display time. Although the invention is provided in a preferred embodiment in a graphic slide display, the present invention is easily adapted for any kind of graphics display including static and dynamic displays. The invention provides analog, digital, and composite signal outputs.

The invention significantly improves display resolution by combining color information derived from a display location neighborhood to produce a display location color and brightness value. In the preferred embodiment of the invention, twice the green information is provided as is red and blue information. The memory-to-display mapping scheme by which color information is shared and combined is arranged to minimize color artifacts on display image edges and to eliminate other such display distortion.

The flicker associated with interlace scanning is significantly reduced by the mixing of adjacent lines. The invention provides optional pattern generation and may include a "library" of graphic and color symbols. Other embodiments of the invention provide skewed color bit information and alternate color bit assignments. It is important to note, however, that all embodiments of the invention provide significantly reduced memory requirements for multicolor (or grey scale), high resolution displays. This is accomplished by sharing color information among neighboring display locations and by examining the neighboring display locations to assemble color information for each display location.

APPENDIX

METHOD AND APPARATUS FOR ASSIGNING COLOR VALUES TO BIT MAP MEMORY DISPLAY LOCATIONS

```
  0    ea 7c 03 00 fc 00 00 00   00 00 00 00 00 00 00 00
 10    00 00 00 00 01 00 00 00   00 00 04 00 e8 03 00 00
 20    43 43 6f 6f 70 70 79 79   72 72 69 69 67 67 68 68
 30    74 74 20 20 28 28 63 63   29 29 20 20 31 31 39 39
 40    38 38 33 33 20 20 62 62   79 79 20 20 47 47 65 65
 50    6e 6e 65 65 72 72 61 61   6c 6c 20 20 50 50 61 61
 60    72 72 61 61 6d 6d 65 65   74 74 72 72 69 69 63 63
 70    73 73 20 20 43 43 6f 6f   72 72 70 70 6f 6f 72 72
 80    61 61 74 74 69 69 6f 6f   6e 6e e4 20 c3 fa a1 02
 90    00 a3 08 00 33 c0 b9 20   00 bf 0a 00 fc f3 ab 8e
 A0    d8 8c 06 4a 05 c7 06 18   01 24 02 8c 0e 12 01 8c
 B0    0e 1a 01 8e 1e 4a 05 f7   06 5a 00 ff ff 78 f8 e4
 C0    20 b0 af e6 a2 fa 33 c0   8e d8 c7 06 48 05 50 fb
 D0    e6 61 e4 40 a8 80 75 fa   33 c0 e6 40 b9 12 00 e2
 E0    fe e4 40 a8 01 75 fa b0   66 e6 a0 8e 1e 4a 05 fb
 F0    c3 f7 06 5a 00 ff ff 78   f8 c7 06 5a 00 ff ff c7
100    06 82 00 0a 00 8c da 89   16 50 00 33 c0 8e d8 c7
110    06 48 05 01 00 e6 61 e4   40 a8 80 75 fa b9 12 00
120    e2 fe 8e da f7 16 56 00   a1 54 00 e6 46 b0 10 e6
130    40 c3 cc c3 00 04 00 00   80 04 00 00 50 56 1e 2e
140    c5 36 24 01 c7 06 10 01   3c 01 eb 0e 50 56 1e 2e
150    c5 36 28 01 c7 06 10 01   2c 01 57 06 8e 06 4a 05
160    26 8b 3e 4a 00 ad aa ad   aa ad aa ad aa ad aa ad
170    aa ad aa ad aa ad aa ad   aa ad aa ad aa ad aa ad
```

```
180   aa ad aa ad aa ad aa ad    aa ad aa ad aa ad aa ad
190   aa ad aa ad aa ad aa ad    aa ad aa ad aa ad aa ad
1A0   aa ad aa ad aa ad aa ad    aa ad aa ad aa ad aa ad
1B0   aa ad aa ad aa ad aa ad    aa ad aa ad aa ad aa ad
1C0   aa ad aa ad aa ad aa ad    aa ad aa ad aa ad aa ad
1D0   aa ad aa ad aa ad aa ad    aa ad aa ad aa ad aa ad
1E0   aa ad aa ad aa 8e 1e 4a    05 89 3e 4a 00 e4 20 b0
1F0   64 e6 a0 83 2e 4c 00 40    75 34 51 52 55 53 33 c0
200   8e d8 c7 06 48 05 18 fc    8e 1e 4a 05 e4 40 32 e4
210   a3 5a 00 b0 d0 e6 40 e4    40 a8 01 75 fa b0 66 e6
220   a0 8c d8 8e c0 8b ec e8    a3 11 5b 5d 5a 59 07 5f
230   1f 5e 58 cf 50 56 1e b0    66 e6 a0 33 f6 8e de c7
240   06 10 01 2c 01 e6 21 e4    20 b0 64 e6 a0 8e 1e 4a
250   05 83 3e 56 00 00 7d 2d    e4 40 8e de a2 76 05 8e
260   1e 4a 05 f7 16 56 00 e6    61 a1 4e 00 a3 4a 00 a1
270   52 00 a3 4c 00 a0 58 00    e6 44 a0 56 00 d0 e0 04
280   98 e6 40 eb ab 57 06 51    52 55 53 8e de e4 40 a8
290   10 74 04 ff 06 70 05 a8    08 74 04 ff 06 72 05 a8
2A0   04 74 04 ff 06 74 05 a2    77 05 8e 1e 4a 05 32 e4
2B0   a3 5a 00 e8 48 11 e9 71    ff 8b 5e fe 8b 47 fe c3
2C0   8b 3e 08 00 8b 46 fe fc    ab a9 01 00 74 01 40 05
2D0   02 00 01 06 08 00 8b c7    c3 8b 7e fe 8b 76 fc 8b
2E0   44 fe 89 7c fe a9 01 00    74 01 40 f7 c7 01 00 74
2F0   01 47 8b df 2b d8 74 31    77 30 fc 03 fe 03 f0 8b
300   d6 8b 0e 08 00 2b ce d1    e9 f6 06 5b 00 ff 78 f9
310   f3 a5 01 1e 08 00 b9 20    00 be 0a 00 8b 04 3b c2
320   76 02 01 1c 83 c6 02 e2    f3 c3 fd 03 fe 03 f0 8b
330   d6 8b 0e 08 00 2b ce 03    f9 03 f1 83 ef 02 83 ee
340   02 eb c4 8b 76 fe 85 f6    74 df 8b 44 fe a9 01 00
350   74 01 40 bf 0a 00 b9 20    00 8b d8 03 de 3b 35 77
360   08 3b 1d 76 04 c7 05 00    00 83 c7 02 e2 ef bf fe
370   ff 8b df 2b d8 eb 83 8b    5e fe a1 08 00 05 02 00
380   8b cc 2b c8 81 e9 00 01    89 0f c3 00 fc 8c c8 8e
390   d8 be e0 04 33 c0 8e c0    8b f8 b9 08 00 f3 a5 b8
3A0   00 10 8e d0 bc fe ff be    f0 04 bf 00 01 b9 80 00
3B0   90 f3 a5 b0 80 e6 86 b0    00 e6 82 b0 14 e6 80 b0
3C0   03 e6 86 e4 80 e8 c2 fc    e8 35 02 b0 13 e6 a0 b0
3D0   40 e6 a2 b0 01 e6 a2 b0    ff e6 a2 fb 2e 8b 1e 04
3E0   00 2e 8b 0e 06 00 33 c0    8e d8 89 1e 78 05 89 0e
3F0   7a 05 a3 70 05 a3 72 05    a3 74 05 b3 1f eb 0f b0
400   ff e6 a2 33 c0 8e d8 c6    06 35 05 00 b3 01 33 c0
410   8e d8 a2 08 05 fe c0 a2    00 05 b0 08 a2 02 05 be
420   02 00 2e 8b 0e 02 00 33    c0 2e 03 04 15 00 00 46
430   46 e2 f6 f7 d0 2e 3b 06    00 00 75 fe e2 fe fe cb
440   75 fa f7 c4 01 00 75 b7    b8 60 00 8e c0 8e d0 bc
450   f0 ff bf 00 00 be 50 1a    8c c8 8e d8 b9 84 00 f3
460   a4 8c c0 8e d8 8c d3 3b    c3 75 d1 cd 4e be 5c 00
470   cd 52 be 5c 00 cd 50 0b    c0 74 3c 50 51 8b c1 cd
480   4d 59 58 83 c3 0f 81 e3    f0 ff 51 53 33 d2 cd 53
490   5b 53 cd 55 5e 59 41 d1    e9 fc bf 00 00 f3 a5 8c
4A0   d8 33 db 53 50 53 8e d8    8e c0 8b c3 8b cb 8b d3
4B0   8b eb 8b f3 8b fb cb cc    eb fd cf 55 8b ec 81 66
4C0   06 ff fe 5d eb 01 90 50    1e 33 c0 8e d8 a0 00 05
4D0   0a c0 75 03 1f 58 cf 53    bb 02 05 80 0f 02 f6 07
4E0   04 74 07 80 27 fd 5b 1f    58 cf 5b 1f 58 e9 36 07
4F0   aa 04 00 fc ab 04 00 fc    1e 06 00 fc b7 04 00 fc
500   00 00 00 00 00 00 00 00    00 00 00 00 00 00 00 00
```

```
510   00 00 00 00 00 00 00 00   00 00 00 00 00 00 00 00
520   38 0d 00 fc 43 0d 00 fc   61 0d 00 fc 75 0d 00 fc
530   7a 0d 00 fc 84 0d 00 fc   90 0d 00 fc 94 0d 00 fc
540   9e 0d 00 fc b4 0d 00 fc   bf 0d 00 fc c9 0d 00 fc
550   d6 0d 00 fc db 0d 00 fc   e7 0d 00 fc 08 0e 00 fc
560   16 0e 00 fc 2a 0e 00 fc   38 0e 00 fc 43 0e 00 fc
570   5a 0e 00 fc 71 0e 00 fc   7c 0e 00 fc 87 0e 00 fc
580   92 0e 00 fc 9d 0e 00 fc   b0 0e 00 fc b0 0e 00 fc
590   b0 0e 00 fc b0 0e 00 fc   b0 0e 00 fc b0 0e 00 fc
5A0   b0 0e 00 fc b0 0e 00 fc   b0 0e 00 fc b0 0e 00 fc
5B0   b0 0e 00 fc b0 0e 00 fc   b0 0e 00 fc b0 0e 00 fc
5C0   b0 0e 00 fc b0 0e 00 fc   b0 0e 00 fc b0 0e 00 fc
5D0   b0 0e 00 fc b0 0e 00 fc   b0 0e 00 fc b0 0e 00 fc
5E0   b0 0e 00 fc b0 0e 00 fc   b0 0e 00 fc b0 0e 00 fc
5F0   b0 0e 00 fc b0 0e 00 fc   b0 0e 00 fc d8 0c 00 fc
600   33 c0 8e d8 a2 36 05 a2   37 05 a2 34 05 a3 40 05
610   a3 42 05 a3 38 05 a3 3a   05 a3 3c 05 a3 3e 05 a3
620   7c 05 a3 80 05 a3 84 05   c6 06 88 05 40 c3 f8 f8
630   f8 f8 f8 f8 f8 f8 f8 f8   f8 f8 f8 f8 f8 f8 f8 f8
640   f8 f8 f8 f8 f8 f8 f8 f8   f8 f8 f8 f8 f8 f8 f8 f8
650   f8 f8 f8 f8 f8 f8 f8 f8   f8 f8 f8 f8 f8 f8 f8 f8
660   f8 f8 f8 f8 f8 f8 f8 f8   f8 f8 f8 f8 f8 f8 f8 f8
670   f8 f8 f8 f8 f8 f8 f8 f8   f8 f8 f8 f8 f8 f8 f8 f8
680   f8 f8 f8 f8 f8 f8 f8 f8   f8 f8 f8 f8 f8 f8 f8 f8
690   f8 f8 f8 f8 f8 f8 f8 f8   f8 f8 f8 f8 f8 f8 f8 f8
6A0   f8 f8 f8 f8 f8 f8 f8 f8   f8 f8 f8 f8 f8 f8 f8 f8
6B0   f8 f8 f8 f8 f8 f8 f8 f8   f8 f8 f8 f8 f8 f8 f8 f8
6C0   f8 f8 f8 f8 f8 f8 f8 f8   f8 f8 f8 f8 f8 f8 f8 f8
6D0   f8 f8 f8 f8 f8 f8 f8 f8   f8 f8 f8 f8 f8 f8 f8 f8
6E0   f8 f8 f8 f8 f8 f8 f8 f8   f8 f8 f8 f8 f8 f8 f8 f8
6F0   f8 f8 f8 f8 f8 f8 f8 f8   f8 f8 f8 f8 f8 f8 f8 f8
700   f8 f8 f8 f8 f8 f8 f8 f8   f8 f8 f8 f8 f8 f8 f8 f8
710   f8 f8 f8 f8 f8 f8 f8 f8   f8 f8 50 1e 33 c0 8e d8
720   a1 30 05 40 a3 30 05 53   52 51 e4 00 f6 06 78 05
730   01 74 02 f6 d0 8a e0 a0   34 05 88 26 34 05 b9 08
740   00 f7 06 42 05 ff ff 74   59 78 7e a8 01 74 08 a8
750   02 75 5e fe 06 36 05 ff   06 42 05 81 3e 42 05 5e
760   01 7f 07 d1 e8 e2 e4 e9   4c 01 8b 16 3c 05 0b 16
770   3e 05 74 16 80 0e 38 05   01 c7 06 3c 05 00 00 c7
780   06 3e 05 00 00 c6 06 35   05 00 c6 06 37 05 00 c6
790   06 36 05 00 c7 06 40 05   00 00 c7 06 42 05 00 00
7A0   eb a9 a8 01 74 04 a8 02   75 19 d1 e8 e2 f4 e9 05
7B0   01 80 3e 37 05 0d 74 0b   83 3e 42 05 04 7e 04 fe
7C0   06 36 05 c7 06 42 05 00   00 a8 01 74 12 ff 0e 42
7D0   05 83 3e 42 05 bb 7e 92   d1 e8 e2 ed e9 d7 00 83
7E0   3e 42 05 fb 7f 1f 83 3e   42 05 f6 7f 15 83 3e 42
7F0   05 f1 7c 4c f6 06 37 05   ff 75 45 c6 06 37 05 01
800   eb 92 f9 eb 01 f8 d1 1e   40 05 f6 06 37 05 ff 74
810   99 fe 06 37 05 80 3e 37   05 0d 7c 27 a0 3e 36 05
820   03 7f 1d 8b 16 40 05 87   16 44 05 3b 16 44 05 75
830   0f bb 3c 00 90 2e 3b 97   b2 09 74 0a 4b 4b 75 f5
840   e9 27 ff e9 54 ff d1 eb   80 fb 01 75 18 80 3e 35
850   05 0c 74 06 fe 06 35 05   eb 10 f7 06 48 05 ff ff
860   75 08 e9 9a fb c6 06 35   05 00 8a f9 8a cb ba 01
870   00 80 f9 10 7d 20 d3 e2   3b 16 3c 05 74 05 80 0e
880   38 05 01 89 16 3c 05 09   16 38 05 c7 06 3e 05 00
890   00 8a cf e9 f4 fe 80 e9   10 d3 e2 3b 16 3e 05 74
8A0   05 80 0e 38 05 01 89 16   3e 05 09 16 3a 05 c7 06
```

```
8B0    3c 05 00 00 eb db a0 88    05 bb 07 00 23 d8 2b c3
8C0    fe c3 80 fb 05 7e 69 8b    16 84 05 8b 1e 86 05 87
8D0    16 80 05 87 1e 82 05 8b    0e 7c 05 0b 0e 7e 05 0b
8E0    0e 3c 05 0b 0e 3e 05 74    04 0c 80 eb 02 24 7f 3b
8F0    16 80 05 75 31 3b 1e 82    05 75 2b 3b 16 7c 05 75
900    06 3b 1e 7e 05 74 17 8b    0e 7c 05 0b 0e 7e 05 74
910    05 80 0e 38 05 01 89 16    7c 05 89 1e 7e 05 09 16
920    38 05 09 1e 3a 05 33 db    89 1e 84 05 89 1e 86 05
930    03 c3 a2 88 05 e6 01 e4    60 d1 e3 d1 e3 b4 04 a8
940    01 75 1e 2e 8a 8f 9c 09    ba 01 00 80 f9 10 7d 08
950    d3 e2 09 16 84 05 eb 09    80 e9 10 d3 e2 09 16 86
960    05 43 d0 e8 fe cc 7f d7    59 5a 5b f7 06 48 05 ff
970    ff 74 12 ff 06 48 05 75    0c e6 60 80 3e 35 05 0c
980    75 03 e9 dd fe a0 00 05    0a c0 75 03 1f 58 cf fe
990    c8 75 09 e4 8a a8 01 74    f3 e9 e8 00 fe c8 75 03
9A0    eb 5e 90 fe c8 75 03 e9    87 00 eb e7 04 09 1f 0b
9B0    1e 0e 1b 0d 1d 1c 03 1a    12 15 18 01 11 14 17 19
9C0    10 13 16 02 b0 08 a0 08    90 09 20 09 01 00 01 00
9D0    01 00 01 00 30 09 01 00    00 09 01 00 10 09 80 09
9E0    01 00 00 08 10 08 20 08    30 08 40 08 50 08 60 08
9F0    70 08 80 08 a0 08 c0 08    d0 08 50 09 40 09 60 0b
A00    e4 8a a8 20 74 28 06 53    a1 0a 05 8e c0 a1 0c 05
A10    8b d8 26 8a 07 e6 80 8b    c3 40 a3 0c 05 5b 07 a0
A20    04 05 fe c8 a2 04 05 75    05 b0 01 a2 00 05 1f 58
A30    cf e4 8a a8 01 74 28 06    53 a1 0a 05 8e c0 a1 0c
A40    05 8b d8 e4 80 26 88 07    8b c3 40 a3 0c 05 5b 07
A50    a0 04 05 fe c8 a2 04 05    75 05 b0 01 a2 00 05 1f
A60    58 cf a3 0a c9 0a d8 0a    ed 0a 02 0b 0a 0b 12 0b
A70    20 0b 2e 0b 3c 0b 4a 0b    60 0b 77 0b 83 0b 8b 0b
A80    93 0b a3 0b e4 8a a8 20    75 03 1f 58 cf e4 80 0a
A90    c0 75 07 a0 02 05 e6 80    eb f0 3c 11 76 03 e9 23
AA0    01 32 e4 fe c8 02 c0 05    52 0a 53 8b d8 2e 8b 07
AB0    5b ff e0 55 8b ec 8b 46    0a f6 c4 02 5d 74 13 a0
AC0    02 05 a8 02 75 0c 0c 04    a2 02 05 e6 80 1f 58 e9
AD0    54 01 a0 02 05 e6 80 eb    b1 a0 02 05 0c 04 e6 80
AE0    a2 02 05 1f 58 e9 3e 01    55 a1 18 05 8b e8 b8 79
AF0    0c 89 46 00 b8 00 fc 89    46 02 5d eb 8d a0 08 05
B00    e6 80 32 c0 a2 08 05 a0    02 05 24 7f a2 02 05 e9
B10    78 ff b0 03 a2 00 05 e9    70 ff b0 02 a2 00 05 e9
B20    68 ff 52 a1 0c 05 8b d0    a0 04 05 ee 5a e9 5a ff
B30    52 a1 0c 05 8b d0 a1 04    05 ef 5a e9 4c ff 52 a1
B40    0c 05 8b d0 ec a2 04 05    5a e9 3e ff 52 a1 0c 05
B50    8b d0 ed a3 04 05 5a e9    30 ff 06 53 a1 0a 05 8e
B60    c0 a1 0c 05 8b d8 26 8a    07 e6 80 5b 07 e9 1a ff
B70    06 53 a1 0a 05 8e c0 a1    0c 05 8b d8 a0 04 05 26
B80    88 07 5b 07 e9 03 ff a1    22 05 80 cc 01 a3 22 05
B90    e9 55 ff a0 04 05 e6 80    e9 ef fe a0 05 05 e6 80
BA0    e9 e7 fe a0 07 05 e6 80    a0 02 05 24 ef a2 02 05
BB0    e9 d7 fe a0 04 05 a2 06    05 a0 02 05 24 f7 a2 02
BC0    05 e9 c6 fe 3c d0 73 13    a0 08 05 0c 01 a2 08 05
BD0    a0 02 05 0c 80 a2 02 05    e9 af fe 53 8a d8 80 e3
BE0    0f 3c f0 72 14 a1 04 05    d1 e0 d1 e0 d1 e0 d1 e0
BF0    02 c3 a3 04 05 5b e9 91    fe 3c e0 72 14 a1 0a 05
C00    d1 e0 d1 e0 d1 e0 d1 e0    02 c3 a3 0a 05 5b e9 79
C10    fe a1 0c 05 d1 e0 d1 e0    d1 e0 d1 e0 02 c3 a3 0c
C20    05 5b e9 65 fe 00 50 1e    33 c0 8e d8 58 a3 26 05
C30    58 a3 10 05 8b c3 a3 12    05 8b c1 a3 14 05 8b c2
C40    a3 16 05 8b c5 a3 1a 05    8b c6 a3 1c 05 8b c7 a3
```

```
C50   1e 05 8c d0 a3 28 05 8c   c0 a3 2a 05 8b c4 a3 18
C60   05 8b ec 8b 46 00 a3 20   05 8b 46 02 a3 24 05 8b
C70   46 04 a3 22 05 80 cc 02   89 46 04 c7 46 02 00 fc
C80   c7 46 00 76 0c cf f4 eb   fd 33 c0 8e d8 a0 02 05
C90   24 f8 a2 02 05 a1 28 05   8e d0 a1 18 05 8b e0 8b
CA0   ec a1 22 05 89 46 04 a1   24 05 89 46 02 a1 20 05
CB0   89 46 00 a1 2a 05 8e c0   a1 1e 05 8b f8 a1 1c 05
CC0   8b f0 a1 1a 05 8b e8 a1   16 05 8b d0 a1 14 05 8b
CD0   c8 a1 12 05 8b d8 a1 10   05 50 a1 26 05 8e d8 58
CE0   cf 00 f2 0c 05 0d 1e 0d   fb 80 fc 03 72 01 cf 53
CF0   1e 8a c4 32 e4 02 c0 05   d2 0c 8b d8 2e ff 27 1f
D00   5b cf 33 c0 8e d8 a0 02   05 a8 08 74 04 32 c0 eb
D10   ee b0 01 eb ea 33 c0 8e   d8 8a 26 02 05 f6 c4 08
D20   75 f7 a0 06 05 80 cc 08   88 26 02 05 eb d1 33 c0
D30   8e d8 8a c2 a2 07 05 a0   02 05 0c 10 a2 02 05 a0
D40   02 05 a8 10 75 f9 eb b7   1e 33 d2 8e da 8b 16 30
D50   05 1f cf 1e 33 c0 8e d8   8b 1e 3c 05 0b 1e 7c 05
D60   87 1e 38 05 a1 3e 05 0b   06 7e 05 87 06 3a 05 1f
D70   cf fb 55 8b ec b8 04 00   50 e8 fb f5 8b e5 8b d8
D80   a1 04 00 5d cf fb e8 17   06 cf fb 55 8b ec 53 e8
D90   b1 f5 eb 5f fb 55 8b ec   50 e8 24 f5 8b d8 eb 53
DA0   e8 ea f2 cf fb 55 8b ec   53 e8 0d f5 eb 45 fb 55
DB0   8b ec b8 04 00 50 56 e8   21 05 8b 0e 04 00 8b 16
DC0   06 00 eb 2f fb 55 8b ec   50 53 e8 0c f5 eb 24 fb
DD0   55 8b ec 56 e8 f3 00 eb   1a fb 55 8b ec 52 51 53
DE0   50 e8 83 05 eb 0d fb e8   30 06 cf fb 55 8b ec 53
DF0   e8 b5 05 8b e5 5d cf 0b   db 74 0f d1 e3 d1 e3 2e
E00   8b 87 06 00 2e 8b 9f 04   00 cf 1e 33 c0 8e d8 a1
E10   7a 05 8b 1e 78 05 1f cf   55 8b ec ff 76 0c ff 76
E20   0a e8 58 07 eb cd 55 8b   ec ff 76 10 ff 76 0e ff
E30   76 0c ff 76 0a e8 aa 08   eb b9 55 8b ec ff 76 0c
E40   ff 76 0a e8 2c 09 eb ab   55 8b ec ff 76 0a e8 3c
E50   09 eb a0 55 8b ec ff 76   12 ff 76 10 ff 76 0e ff
E60   76 0c ff 76 0a e8 3f 09   eb 89 55 8b ec ff 76 12
E70   ff 76 10 ff 76 0e ff 76   0c ff 76 0a e8 7b 09 eb
E80   3b 55 8b ec ff 76 0a e8   be 09 eb 30 55 8b ec ff
E90   76 0a e8 bc 09 eb 25 55   8b ec ff 76 0a e8 ba 09
EA0   eb 1a 55 8b ec ff 76 0a   e8 b8 09 eb 0f 55 8b ec
EB0   ff 76 0e ff 76 0c ff 76   0a e8 b0 09 8b e5 5d cf
EC0   b8 ff ff 8b d8 8b c8 8b   d0 cf 55 83 ec 12 8b ec
ED0   83 3e 46 00 00 74 68 8d   46 08 50 e8 99 f4 8b e5
EE0   c7 06 52 00 00 02 33 db   c7 06 58 00 02 00 a3 4e
EF0   00 89 46 10 89 1e 7a 00   89 1e 7c 00 89 1e 56 00
F00   89 1e 54 00 e8 ea f1 a1   5a 00 85 c0 78 f9 a1 46
F10   00 89 46 0e a1 46 00 05   00 02 8b 5e 0e 3b d8 73
F20   17 ff 46 0e 8b 76 10 ff   46 10 8a 04 30 e4 8a 0f
F30   30 ed 3b c8 74 de eb 07   33 c0 83 c4 12 5d c3 ff
F40   36 46 00 e8 fd f3 8b e5   ff 36 48 00 e8 f4 f3 8b
F50   e5 b8 00 08 50 e8 68 f3   8b e5 c7 06 52 00 00 08
F60   33 db c7 06 58 00 02 00   a3 4e 00 a3 46 00 89 1e
F70   7a 00 89 1e 7c 00 89 1e   56 00 89 1e 54 00 e8 70
F80   f1 a1 5a 00 85 c0 78 f9   8b 36 46 00 8a 04 30 e4
F90   89 46 08 e9 c7 00 c7 06   6a 00 07 00 b8 01 00 bb
FA0   09 00 c7 06 74 00 3b 01   c7 06 78 00 00 04 c7 06
FB0   76 00 00 08 a3 72 00 a3   6c 00 89 1e 70 00 89 1e
FC0   6e 00 e9 af 00 c7 06 6a   00 08 00 b8 02 00 c7 06
FD0   6e 00 09 00 c7 06 70 00   12 00 c7 06 74 00 e7 03
FE0   c7 06 78 00 00 04 c7 06   76 00 00 0e a3 72 00 a3
```

```
FF0   6c 00 e9 7f 00 c7 06 6a   00 05 00 b8 01 00 bb 08
1000  00 c7 06 74 00 e7 03 c7   06 78 00 00 02 c7 06 76
1010  00 00 08 a3 72 00 a3 6c   00 89 1e 70 00 89 1e 6e
1020  00 eb 51 c7 06 6a 00 06   00 b8 02 00 c7 06 6e 00
1030  08 00 c7 06 70 00 10 00   c7 06 74 00 e7 03 c7 06
1040  78 00 00 02 c7 06 76 00   00 0e a3 72 00 a3 6c 00
1050  eb 22 e9 ea fe 86 0f b5   0f e5 0f 13 10 8b f0 81
1060  ee fc 00 72 0c 83 fe 04   73 07 d1 e6 2e ff a4 45
1070  10 e9 cb fe a1 6e 00 f7   2e 72 00 3b 06 70 00 74
1080  06 c7 06 78 00 00 00 a1   6a 00 8b 1e 78 00 03 d8
1090  f7 eb 89 46 00 a1 74 00   99 f7 3e 6e 00 8b 4e 00
10A0  2b c8 3b d9 89 0e 7a 00   89 1e 7c 00 75 03 e9 8e
10B0  fe c7 46 08 00 00 8b 46   08 8b 1e 78 00 3b d8 7e
10C0  22 8b 0e 46 00 03 c8 8b   d9 89 5e 00 03 1e 78 00
10D0  8a 07 30 e4 8b f1 8a 1c   30 ff 3b d8 75 05 ff 46
10E0  08 eb d3 ff 36 78 00 ff   36 46 00 e8 eb f1 8b e5
10F0  ff 36 76 00 e8 c9 f1 8b   e5 8b 1e 6e 00 4b b1 09
1100  d3 e3 8b 0e 78 00 d1 e1   2b d9 8b 0e 76 00 3b d9
1110  a3 4e 00 a3 48 00 89 1e   52 00 7e 04 89 0e 52 00
1120  33 c0 a3 56 00 a3 54 00   a1 78 00 bb 00 02 99 f7
1130  fb d1 e0 40 40 8b 1e 52   00 8b 0e 76 00 3b cb a3
1140  58 00 7e 0f 2b cb 8b c1   bb 00 02 99 f7 fb a3 7c
1150  00 eb 06 c7 06 7c 00 00   00 c7 06 7a 00 00 00 e8
1160  8f ef a1 5a 00 85 c0 78   f9 83 7e 16 00 75 03 e9
1170  c9 00 a1 48 00 89 46 0e   a1 48 00 03 06 76 00 8b
1180  5e 0e 3b d8 72 03 e9 b2   00 8a 47 0b 30 e4 25 10
1190  00 74 55 c7 46 08 00 00   8b 46 08 3d 08 00 7d 4e
11A0  8b 5e 16 03 d8 8b 76 0e   03 f0 8a 04 30 e4 8a 0f
11B0  30 ed 3b c1 89 46 02 89   4e 04 74 27 83 e9 20 3b
11C0  c8 74 20 8b 46 08 8b 76   16 03 f0 8a 1c 30 ff 85
11D0  db 75 15 8b 76 0e 03 f0   8a 04 30 e4 3d 20 00 75
11E0  07 eb 0b ff 46 08 eb b0   83 46 0e 20 eb 8a 8b 46
11F0  0e 05 1a 00 8b f0 8b 04   c7 06 80 00 ff 7f c7 06
1200  7e 00 ff ff 8b 1e 48 00   c7 06 7c 00 00 00 a3 7a
1210  00 89 1e 4e 00 e8 1e 02   a1 5a 00 85 c0 78 f9 b8
1220  ff 7f bb ff ff 2b 1e 7e   00 1b 06 80 00 53 ff 36
1230  48 00 89 1e 76 00 e8 a0   f0 8b e5 a1 48 00 89 46
1240  10 89 46 0e a1 48 00 03   06 76 00 8b 5e 0e 3b d8
1250  73 6d 8a 07 30 e4 85 c0   89 46 00 74 18 3d e5 00
1260  74 13 8a 07 30 e4 3d 2e   00 74 0a 8a 47 0b 30 e4
1270  25 08 00 74 06 83 46 0e   20 eb c9 c7 46 08 00 00
1280  83 7e 08 0b 7d 15 8b 76   10 ff 46 10 8b 7e 0e ff
1290  46 0e 8a 05 88 04 ff 46   08 eb e5 83 46 0e 0f c7
12A0  46 08 00 00 83 7e 08 06   7d 9a 8b 76 10 ff 46 10
12B0  8b 7e 0e ff 46 0e 8a 05   88 04 ff 46 08 eb e5 8b
12C0  46 10 2b 06 48 00 50 ff   36 48 00 a3 76 00 e8 08
12D0  f0 8b e5 b8 01 00 83 c4   12 5d c3 55 83 ec 0c 8b
12E0  ec a1 48 00 89 46 08 a1   48 00 03 06 76 00 8b 5e
12F0  08 3b d8 73 3b c7 46 0a   00 00 8b 46 0a 3d 0b 00
1300  7d 41 8b 5e 08 03 d8 8b   76 10 03 f0 8a 04 30 e4
1310  8a 0f 30 ed 3b c1 89 46   02 89 4e 04 74 07 83 c1
1320  20 3b c8 75 05 ff 46 0a   eb d0 83 46 08 11 eb b7
1330  8b 76 12 c7 44 02 00 00   c7 04 00 00 33 c0 83 c4
1340  0c 5d c3 8b 46 08 05 0d   00 8b f0 8b 44 02 8b 1c
1350  8b 7e 12 89 45 02 89 1d   8b 46 08 05 0b 00 8b f0
1360  8b 04 83 c4 0c 5d c3 55   83 ec 02 8b ec a1 5a 00
1370  85 c0 78 f9 8b 46 08 8b   5e 06 8b 4e 0c 8b 56 0a
1380  c7 06 7c 00 00 00 a3 4e   00 a3 68 00 89 0e 80 00
```

| | | | | | | | | | | | | | | | | |
|---|---|---|---|---|---|---|---|---|---|---|---|---|---|---|---|---|
| 1390 | 89 | 16 | 7e | 00 | 89 | 1e | 7a | 00 | e8 | 9b | 00 | 83 | c4 | 02 | 5d | c3 |
| 13A0 | 55 | 8b | ec | a1 | 5a | 00 | 5d | c3 | 55 | 83 | ec | 02 | 8b | ec | 8b | 46 |
| 13B0 | 06 | 3b | 06 | 68 | 00 | 74 | 07 | 33 | c0 | 83 | c4 | 02 | 5d | c3 | a1 | 5a |
| 13C0 | 00 | 85 | c0 | 78 | f9 | a1 | 5a | 00 | 83 | c4 | 02 | 5d | c3 | 55 | 83 | ec |
| 13D0 | 04 | 8b | ec | a1 | 5a | 00 | 25 | 9c | 00 | 75 | 1b | a1 | 52 | 00 | 01 | 06 |
| 13E0 | 4e | 00 | 33 | db | 85 | c0 | 79 | 01 | 4b | 29 | 06 | 7e | 00 | 19 | 1e | 80 |
| 13F0 | 00 | e8 | 42 | 00 | eb | 03 | e8 | f8 | ec | 83 | c4 | 04 | 5d | c3 | 55 | 83 |
| 1400 | ec | 02 | 8b | ec | a1 | 82 | 00 | 48 | 85 | c0 | a3 | 82 | 00 | 7e | 06 | e8 |
| 1410 | b3 | ec | e8 | dc | ec | 83 | c4 | 02 | 5d | c3 | 55 | 83 | ec | 02 | 8b | ec |
| 1420 | a1 | 5a | 00 | 85 | c0 | 79 | 0a | 33 | c0 | a3 | 7a | 00 | a3 | 7c | 00 | eb |
| 1430 | ef | 83 | c4 | 02 | 5d | c3 | 55 | 83 | ec | 08 | 8b | ec | 83 | 3e | 7c | 00 |
| 1440 | 00 | 74 | 03 | e9 | e8 | 00 | a1 | 7a | 00 | 85 | c0 | 74 | 05 | 3d | f0 | 0f |
| 1450 | 7c | 0b | c7 | 06 | 5a | 00 | 00 | 00 | 83 | c4 | 08 | 5d | c3 | c7 | 06 | 7c |
| 1460 | 00 | 00 | 00 | a1 | 7a | 00 | 89 | 46 | 04 | a1 | 6c | 00 | 01 | 06 | 7c | 00 |
| 1470 | 8b | 46 | 04 | 8b | 1e | 46 | 00 | 03 | d8 | b9 | 02 | 00 | 99 | f7 | f9 | 03 |
| 1480 | d8 | 8b | 07 | 8b | 5e | 04 | 81 | e3 | 01 | 00 | 89 | 46 | 06 | 74 | 09 | bb |
| 1490 | 10 | 00 | 99 | f7 | fb | 89 | 46 | 06 | 8b | 46 | 06 | 25 | ff | 0f | 8b | 5e |
| 14A0 | 04 | 43 | 3b | c3 | 89 | 46 | 06 | 89 | 5e | 04 | 74 | bd | a1 | 7a | 00 | f7 |
| 14B0 | 2e | 6c | 00 | 03 | 06 | 6a | 00 | a3 | 7a | 00 | 99 | f7 | 3e | 70 | 00 | a3 |
| 14C0 | 54 | 00 | a1 | 7a | 00 | 99 | f7 | 3e | 70 | 00 | 89 | 56 | 00 | 8b | 46 | 00 |
| 14D0 | 99 | f7 | 3e | 6e | 00 | a3 | 56 | 00 | a1 | 7a | 00 | 99 | f7 | 3e | 6e | 00 |
| 14E0 | 42 | 8b | 46 | 06 | b1 | 09 | 8b | 1e | 7c | 00 | d3 | e3 | 33 | c9 | 85 | db |
| 14F0 | 79 | 01 | 49 | a3 | 7a | 00 | 8b | c1 | 8b | 0e | 80 | 00 | 89 | 16 | 58 | 00 |
| 1500 | 8b | 16 | 7e | 00 | e8 | 3a | 05 | 7e | 44 | 81 | c2 | 00 | 02 | 83 | d1 | 00 |
| 1510 | 83 | ea | 01 | 83 | d9 | 00 | 8b | c1 | 8b | da | 33 | c9 | ba | 00 | 02 | e8 |
| 1520 | 77 | 04 | c7 | 06 | 7a | 00 | 00 | 00 | 89 | 1e | 7c | 00 | eb | 1f | b8 | 01 |
| 1530 | 00 | 8b | 1e | 56 | 00 | 43 | 3b | 1e | 72 | 00 | a3 | 58 | 00 | 89 | 1e | 56 |
| 1540 | 00 | 7c | 0a | c7 | 06 | 56 | 00 | 00 | 00 | ff | 06 | 54 | 00 | a1 | 6e | 00 |
| 1550 | 40 | 2b | 06 | 58 | 00 | 8b | 1e | 7c | 00 | 3b | c3 | 89 | 46 | 04 | 7e | 03 |
| 1560 | 89 | 5e | 04 | b1 | 09 | 8b | 46 | 04 | d3 | e0 | 8b | 5e | 04 | 29 | 1e | 7c |
| 1570 | 00 | a3 | 52 | 00 | e8 | 7a | eb | 83 | c4 | 08 | 5d | c3 | 8b | dc | 36 | 8b |
| 1580 | 47 | 04 | 36 | 8b | 7f | 02 | 0b | ff | 79 | 04 | 03 | f8 | 33 | ff | 03 | c7 |
| 1590 | 3d | 00 | 08 | 72 | 03 | b8 | 00 | 08 | 2b | c7 | 81 | c7 | 00 | 08 | 1e | b9 |
| 15A0 | 00 | 80 | 8e | d9 | 8b | d7 | 81 | e2 | 0f | 00 | f7 | da | 83 | c2 | 20 | 3b |
| 15B0 | c2 | 76 | 23 | c6 | 05 | 1f | 2b | c2 | 03 | fa | 8b | d0 | 81 | e2 | e0 | 07 |
| 15C0 | 52 | d1 | ea | d1 | ea | d1 | ea | f7 | da | 81 | c2 | d1 | 16 | b3 | 1f | ff |
| 15D0 | d2 | 5a | 03 | fa | 2b | c2 | 48 | 78 | 02 | 88 | 05 | 1f | c3 | 88 | 9d | 00 |
| 15E0 | 08 | 88 | 9d | e0 | 07 | 88 | 9d | c0 | 07 | 88 | 9d | a0 | 07 | 88 | 9d | 80 |
| 15F0 | 07 | 88 | 9d | 60 | 07 | 88 | 9d | 40 | 07 | 88 | 9d | 20 | 07 | 88 | 9d | 00 |
| 1600 | 07 | 88 | 9d | e0 | 06 | 88 | 9d | c0 | 06 | 88 | 9d | a0 | 06 | 88 | 9d | 80 |
| 1610 | 06 | 88 | 9d | 60 | 06 | 88 | 9d | 40 | 06 | 88 | 9d | 20 | 06 | 88 | 9d | 00 |
| 1620 | 06 | 88 | 9d | e0 | 05 | 88 | 9d | c0 | 05 | 88 | 9d | a0 | 05 | 88 | 9d | 80 |
| 1630 | 05 | 88 | 9d | 60 | 05 | 88 | 9d | 40 | 05 | 88 | 9d | 20 | 05 | 88 | 9d | 00 |
| 1640 | 05 | 88 | 9d | e0 | 04 | 88 | 9d | c0 | 04 | 88 | 9d | a0 | 04 | 88 | 9d | 80 |
| 1650 | 04 | 88 | 9d | 60 | 04 | 88 | 9d | 40 | 04 | 88 | 9d | 20 | 04 | 88 | 9d | 00 |
| 1660 | 04 | 88 | 9d | e0 | 03 | 88 | 9d | c0 | 03 | 88 | 9d | a0 | 03 | 88 | 9d | 80 |
| 1670 | 03 | 88 | 9d | 60 | 03 | 88 | 9d | 40 | 03 | 88 | 9d | 20 | 03 | 88 | 9d | 00 |
| 1680 | 03 | 88 | 9d | e0 | 02 | 88 | 9d | c0 | 02 | 88 | 9d | a0 | 02 | 88 | 9d | 80 |
| 1690 | 02 | 88 | 9d | 60 | 02 | 88 | 9d | 40 | 02 | 88 | 9d | 20 | 02 | 88 | 9d | 00 |
| 16A0 | 02 | 88 | 9d | e0 | 01 | 88 | 9d | c0 | 01 | 88 | 9d | a0 | 01 | 88 | 9d | 80 |
| 16B0 | 01 | 88 | 9d | 60 | 01 | 88 | 9d | 40 | 01 | 88 | 9d | 20 | 01 | 88 | 9d | 00 |
| 16C0 | 01 | 88 | 9d | e0 | 00 | 88 | 9d | c0 | 00 | 88 | 9d | a0 | 00 | 88 | 9d | 80 |
| 16D0 | 00 | 88 | 9d | 60 | 00 | 88 | 9d | 40 | 00 | 88 | 9d | 20 | 00 | 88 | 9d | 00 |
| 16E0 | 00 | c3 | 55 | 8b | ec | 8b | 46 | 06 | 8b | 7e | 04 | 0b | ff | 79 | 04 | 03 |
| 16F0 | f8 | 33 | ff | 03 | c7 | 3d | 00 | 08 | 72 | 03 | b8 | 00 | 08 | 2b | c7 | 81 |
| 1700 | c7 | 00 | 08 | 1e | b9 | 00 | 80 | 8e | d9 | 8b | d7 | 81 | e2 | 0f | 00 | f7 |
| 1710 | da | 83 | c2 | 20 | 3b | c2 | 76 | 45 | 83 | fa | 20 | 74 | 16 | 50 | 8b | 46 |
| 1720 | 08 | 8b | 4e | 0a | bb | 1f | 00 | e7 | e0 | 88 | 1d | 40 | e2 | f9 | 58 | 2b |

```
1730    c2 03 fa 8b d0 81 e2 e0    0f 52 d1 ea d1 ea d1 ea
1740    f7 da 81 c2 d1 16 50 8b    46 08 8b 4e 0a bb 1f 00
1750    e7 e0 ff d2 40 e2 f9 58    5a 2b c2 03 fa 48 78 0f
1760    8b d8 8b 46 08 8b 4e 0a    e7 e0 88 1d 40 e2 f9 1f
1770    5d c3 8b dc b8 80 81 8c    c1 8e c0 36 8b 47 04 36
1780    8b 5f 02 81 e3 f0 ff 26    89 07 8e c1 c3 8b dc b8
1790    80 81 8c c1 8e c0 36 8b    5f 02 81 e3 f0 ff 26 8b
17A0    07 26 8b 07 8e c1 c3 55    8b ec b9 80 81 8e d9 8b
17B0    7e 0c 8b 46 04 d1 e8 d1    e8 d1 e8 d1 e8 8b 5e 04
17C0    03 5e 06 d1 eb d1 eb d1    eb d1 eb 2b d8 43 89 5e
17D0    06 8b 46 08 ba 0e 00 8b    5e 0a e7 e0 8b 4e 06 8b
17E0    76 04 81 e6 f0 ff 3b 04    83 c6 10 a5 03 f2 e2 fb
17F0    40 4b 75 e6 8c c0 8e d8    5d c3 55 8b ec b9 80 81
1800    8e c1 8b 76 0c 8b 46 04    d1 e8 d1 e8 d1 e8 d1 e8
1810    8b 5e 04 03 5e 06 d1 eb    d1 eb d1 eb d1 eb 2b d8
1820    43 89 5e 06 8b 46 08 ba    0e 00 8b 5e 0a e7 e0 8b
1830    4e 06 8b 7e 04 81 e7 f0    ff a5 03 fa e2 fb 40 4b
1840    75 eb 8c d8 8e c0 5d c3    8b dc 36 8b 47 02 e7 e0
1850    c3 8b dc 36 8b 47 02 e7    e2 c3 8b dc 36 8b 47 02
1860    e6 e6 c3 8b dc 36 8b 47    02 e7 e4 c3 55 83 ec 04
1870    8b ec 8c 5e 02 fc 8b 76    0c 8b 5e 0a 8b 07 89 46
1880    00 46 8b 5e 08 8b 0f e8    eb 00 01 07 e8 e6 00 03
1890    c8 e8 e1 00 01 46 00 e8    b4 00 03 c8 81 c1 00 08
18A0    8b d9 f7 d8 8b d0 8b f8    b9 00 80 89 4e 02 8e d9
18B0    e8 9b 00 03 f8 78 07 ff    46 00 03 fa eb f7 e8 8d
18C0    00 0b c0 74 eb 8b c8 03    cf 8b c8 78 04 8b cf f7
18D0    d9 2b c1 50 8b 46 00 e7    e0 51 81 e1 f0 00 d1 e9
18E0    d1 e9 f7 d9 81 c1 1c 19    b0 0f ff e1 88 81 f0 00
18F0    88 81 e0 00 88 81 d0 00    88 81 c0 00 88 81 b0 00
1900    88 81 a0 00 88 81 90 00    88 81 80 00 88 81 70 00
1910    88 81 60 00 88 81 50 00    88 81 40 00 88 81 30 00
1920    88 81 20 00 88 81 10 00    88 81 00 00 59 8b c1 81
1930    e1 f0 ff 03 f9 25 0f 00    74 04 48 88 01 40 03 f8
1940    58 74 03 e9 7b ff ff 46    00 8b fa e9 73 ff 8c c0
1950    8e d8 ac a8 80 74 07 25    7f 00 8e 5e 02 c3 a8 40
1960    74 0e 8a e0 ac 25 7f 3f    d0 e0 d1 e8 8e 5e 02 c3
1970    83 c4 06 5d c3 8c c0 8e    d8 ac a8 80 74 0a 25 7f
1980    00 2d 40 00 8e 5e 02 c3    8a e0 ac 25 7f 3f d0 e0
1990    d1 e8 2d 00 10 8e 5e 02    c3 55 83 ec 04 8b ec 89
19A0    4e 00 0b ca 75 07 33 c0    33 db e9 8f 00 89 46 02
19B0    0b c3 75 07 33 c9 33 d2    e9 81 00 8b 4e 00 8b 46
19C0    02 8b f0 85 f6 79 07 f7    d0 f7 db 1d ff ff 33 f1
19D0    89 76 00 33 f6 85 c9 79    07 f7 d1 f7 da 83 d9 ff
19E0    75 1d 85 d2 78 19 bf 20    00 d1 e3 d1 d0 d1 d6 3b
19F0    f2 72 03 2b f2 43 4f 75    f0 33 c9 8b d6 eb 21 bf
1A00    10 00 d1 e3 d1 d0 d1 d6    3b f1 72 0b 75 04 3b c2
1A10    72 05 2b c2 1b f1 43 4f    75 e8 8b ce 8b d0 33 c0
1A20    f7 46 00 00 80 74 07 f7    d0 f7 db 1d ff ff f7 46
1A30    02 00 80 74 07 f7 d1 f7    da 83 d9 ff 83 c4 04 5d
1A40    c3 50 33 c1 58 50 78 0f    2b c1 75 0a 33 c0 3b da
1A50    74 08 77 03 48 eb 03 0d    ff 7f 85 c0 58 c3 00 00
1A60    00 00 84 00 00 00 00 00    00 00 00 00 00 00 00 00
1A70    00 00 00 00 00 00 00 00    00 00 00 00 00 00 00 00
1A80    00 00 00 00 00 00 00 00    00 00 00 00 00 00 00 00
1A90    00 00 00 00 00 00 00 00    00 00 00 00 00 00 00 00
1AA0    00 00 00 00 00 00 00 00    00 00 00 00 00 00 00 00
```

```
1AB0     00 00 00 00 00 00 00 00    00 00 00 00 56 49 44 45
1AC0     4f 53 48 4f 42 49 4e 00    00 00 00 00 00 00 00 00
1AD0     00 00 00 00 00 00 00 00    00 00 00 00 00 00 00 00
1AE0     00 00 00 00 00 00
```

I claim:

1. Apparatus for assigning color values from a bit map memory to display locations, comprising:
 a frame buffer memory for storing a digital representation of a display image;
 buffer means, coupled to said frame buffer memory, for storing a digital representation of at least two display lines of said display image;
 register means, coupled to said buffer means, for storing a digital representation of at least two display locations along each of the at least two of said display image lines; and
 mapping means, coupled to said register means, for assigning color values to each display image location in accordance with a predetermined mapping scheme based on color values assigned to a plurality of adjacent memory locations.

2. The apparatus of claim 1, wherein said color values are adapted to select a red, blue, and green electron beam in a color monitor.

3. The apparatus of claim 1, wherein said color values are adapted to selectively provide luminance, in-phase color difference, and quadrature color difference signals to control a color monitor.

4. The apparatus of claim 1, further comprising means for scanning said frame buffer memory at a same rate and position as said display image is scanned on a display.

5. The apparatus of claim 1, said mapping means including:
 (a) first color value means for examining a digital representation corresponding to the display location directly below a current first display location to determine a first color value at said current first location;
 (b) second color value means for examining a digital representation corresponding to the display location directly below to the left and right, and directly to the left and right of a current second display location to determine a second color value at said second current location; and
 (c) third color value means for examining a digital representation corresponding to the display location directly below to the left and right, and directly to the left and right of a current third display location to determine a third color value at said third current location, whereby frame buffer memory contents are mapped onto a display as corresponding color values.

6. The apparatus of claim 5, said second and third color value means being operable to examine a digital representation corresponding to the display locations directly below to the left and right, directly below, and directly to the left of said current second and third display locations to determine second and third color values at said current second and third locations.

7. The apparatus of claim 1, further comprising:
 encoding means, coupled to said mapping means, for assembling assigned color values at each display image location to produce an output signal in a display standard adapted to operate a color display.

8. The apparatus of claim 1, said encoding means further comprising:
 shift register means, coupled to receive a component portion of the color value assigned to each display image location, for producing in-phase and quadrature color difference signal outputs corresponding to said color value component portion;
 summing means, coupled to receive said shift register means output signals, for summing said signals to produce in-phase and quadrature color difference signals corresponding to said color values; and
 second summing means, coupled to receive said color value components, for producing a luminance signal output in accordance therewith.

9. In a video image storing apparatus, including a processor for storing a digital representation of images to and retrieving said representation from a storage medium, an apparatus for assembling said representation into a high resolution, multicolor video image, comprising:
 a frame buffer memory, adapted to receive said representation from said processor, for storing in bit map form said digital representation of said video image;
 mapping means, coupled to said frame buffer memory, for assigning color values to each video image location in accordance with a predetermined mapping scheme based on color values assigned to a plurality of adjacent memory locations.

10. The apparatus of claim 9, further comprising video encoder means, coupled to receive a video image output signal from said mapping means, for assembling said video image signal into a composite video signal adapted to operate a color display.

11. The apparatus of claim 9, said mapping means further comprising:
 buffer means, coupled to said frame buffer memory, for storing a digital representation of at least two sequential display lines of said video image; and
 register means, coupled to said buffer means, for storing a digital representation of at least two sequential display locations along each of said at least two of said display image lines.

12. The apparatus of claim 9 further comprising:
 shift register means, coupled to receive a component portion of a color value from said mapping means for a color display location, for producing in accordance therewith in-phase and quadrature color difference signals;
 summing means, coupled to said shift register means, for receiving said in-phase and quadrature color difference signals for each of said color value component portions and for producing in-phase and quadrature color difference signal outputs which are a summation of the color component signals; and
 summing means, coupled to receive a component portion of each of said color values and for producing a summation of said color value component portions to produce a corresponding luminance signal.

13. A method for assigning color values from a bit map memory to video display locations, comprising to steps of:
 storing a digital representation of a video image in a frame buffer memory;

storing a digital representation of at least two display lines of said video image in an intermediate buffer coupled to said frame buffer memory;

storing a digital representation of at least two display locations along each of the at least two of said video image display lines in a register coupled to said buffer;

assigning color values to each video image location in accordance with a predetermined mapping scheme based on color values assigned to adjacent memory locations.

14. The method of claim 13, further comprising the step of selecting a red, blue, and green electron beam in a color monitor in accordance with said color values.

15. The method of claim 13, further comprising the step of selectively providing luminance, in-phase color difference, and quadrature color difference signals to control a color monitor in accordance with said color values.

16. The method of claim 13, further comprising the step of scanning said frame buffer memory at the same rate and position as said video images are scanned in a display.

17. The method of claim 13, further comprising the steps of:

examining a digital representation corresponding to a video image location directly below a current first video image location to determine a first color value at said current first location;

examining a digital representation corresponding to a video image location directly below to the left and right, and directly to the left and right of a current second video image location to determine a second color value at said second current location;

examining a digital representation corresponding to a video image location directly below to the left and right, directly to the right and left of a current third video image location to determine a third color value at the current third location; and mapping said frame buffer memory contents in accordance therewith onto a display with corresponding color values at corresponding display locations.

18. The method of claim 17, said second and third examining steps further comprising examining a digital representation corresponding to video image locations directly to the left and right, directly below, and directly to the left of said current second and third video image locations to determine second and third color values at said current second and third locations.

19. The method of claim 13 further comprising the steps of:

converting each color value from a digital to an analog signal including an in-phase color difference component and a quadrature color difference component;

summing each of said corresponding in-phase and quadrature color difference components to produce a summed in-phase color difference component and a summed quadrature color difference component; and summing each of said color components to produce a luminance component, whereby a composite video signal is produced.

20. A method for assigning color values to color picture display locations, comprising:

assigning a color value to each location in a memory;

storing in said memory digital values coresponding to a representation of an image to be displayed; and assigning a color value to each of said color picture display locations in accordance with a predetermined mapping scheme so that the color value of each display location is determined from a combination of color values corresponding to adjacent memory locations in accordance with said digital values at said adjacent memory locations.

21. The method of claim 20 wherein said color values are red, green and blue.

22. The method of claim 21 wherein each green representation in said memory is assigned to a lesser number of display locations than each blue and red representation.

23. An apparatus for assigning color values to color picture display locations, comprising:

a memory for storing digital values corresponding to a representation of an image to be displayed, each memory location having a preassigned color value;

means, coupled to said memory, for accessing digital values from said memory corresponding to a plurality of proximate locations; and means for assigning a color value to each display location in accordance with a predetermined mapping scheme based on color values assigned to a plurality of proximate memory locations in accordance with said digital values at said proximate memory locations.

24. The apparatus of claim 23 wherein said color values are red, green and blue.

25. The apparatus of claim 24 wherein each green representation in said memory is assigned to a lesser number of display locations than each blue and red representation.

26. The method of claim 20 wherein each said memory location corresponds to one of said display locations and each said digital value is a single digital bit.

27. The apparatus of claim 23 wherein each said memory location corresponds to one of said display locations and each said digital value is a single digital bit.

28. A method for assigning color values to color picture display locations comprising the steps of:

assigning one of a plurality of color values to each location in a memory for a number of locations equal to the number of said color picture display locations;

storing in said memory digital values corresponding to a representation of an image to be displayed;

assigning the color value at each memory location to a plurality of adjacent display locations in accordance with a predetermined mapping scheme which operates on the digital value at said memory location so that for each color value the presence of that color value at every display location is determined by a number of memory locations less than said number of display locations.

29. The method of claim 28 wherein said color values comprise red, blue and green and green is assigned to a greater number of memory locations than either red or blue.

30. The method of claim 29 wherein every other memory location is assigned the color value of green and the locations between the green locations are alternately assigned the color values of red and blue.

31. The method of claim 30 wherein the digital value in each red and blue memory location controls the red and blue color, respectively, for the display location corresponding to said red or blue memory location, the display location immediately above, the display location immediately to the right and the display location immediately above and to the right.

* * * * *